US010713736B2

(12) United States Patent
Pulver

(10) Patent No.: US 10,713,736 B2
(45) Date of Patent: Jul. 14, 2020

(54) BOOKING SECURITY SERVICES

(71) Applicant: Guard Grabber Technologies, Inc., Santa Barbara, CA (US)

(72) Inventor: Eugene Seth Pulver, Santa Barbara, CA (US)

(73) Assignee: Guard Grabber Technologies, Inc., Santa Barbara, CA (US)

(*) Notice: Subject to any disclaimer, the term of this patent is extended or adjusted under 35 U.S.C. 154(b) by 94 days.

(21) Appl. No.: 15/954,453

(22) Filed: Apr. 16, 2018

(65) Prior Publication Data

US 2018/0300820 A1    Oct. 18, 2018

Related U.S. Application Data

(60) Provisional application No. 62/485,416, filed on Apr. 14, 2017.

(51) Int. Cl.
*G06Q 50/00* (2012.01)
*G06Q 10/06* (2012.01)
(Continued)

(52) U.S. Cl.
CPC ..... *G06Q 50/01* (2013.01); *G06Q 10/063112* (2013.01); *G06Q 10/1097* (2013.01);
(Continued)

(58) Field of Classification Search
CPC ........... G06Q 10/063112; G06Q 50/01; G06Q 10/1097; G06Q 20/102; G06Q 20/14;
(Continued)

(56) References Cited

U.S. PATENT DOCUMENTS

| 5,117,353 A * | 5/1992 | Stipanovich ........... G06Q 10/06 705/7.14 |
| 2005/0010467 A1* | 1/2005 | Dietz .................... G06Q 10/06 709/229 |

(Continued)

OTHER PUBLICATIONS

HireRight and Recruitsoft Form Strategic Partnership; Human Resources Leaders Join to Provide Enhanced Services to Organizations Worldwide Business Wire Mar. 21, 2002: 2193.*

*Primary Examiner* — Timothy Padot
(74) *Attorney, Agent, or Firm* — SoCal IP Law Group LLP; Mark Andrew Goldstein

(57) ABSTRACT

Systems and methods for booking security services are described. A mobile device application provides clients the ability to hire security professionals within the geographical area of the client or another client specified location. The systems and methods facilitate selection of security professionals in real-time from security professionals that qualify for the services needed by a client. The systems and methods provide the ability to track the selected security professionals a mobile device application. The systems and methods display available security professionals in a specified geographical area along with ratings, qualifications and hourly rates, making the client's selection of security professionals simple. The systems and methods allow the security professionals to promote their services. Participation in the systems and methods provides security professionals the ability to work at the time and place of their choosing in the geographical area they prefer.

4 Claims, 46 Drawing Sheets

(51) Int. Cl.
*G06Q 10/10* (2012.01)
*G06Q 30/06* (2012.01)
*G06Q 20/14* (2012.01)
*G07F 17/40* (2006.01)
*G07F 17/00* (2006.01)
*G06Q 20/10* (2012.01)
*G06Q 20/32* (2012.01)

(52) U.S. Cl.
CPC ........... *G06Q 20/102* (2013.01); *G06Q 20/14* (2013.01); *G06Q 20/322* (2013.01); *G06Q 30/0641* (2013.01); *G07F 17/0014* (2013.01); *G07F 17/0042* (2013.01); *G07F 17/40* (2013.01)

(58) Field of Classification Search
CPC .............. G06Q 20/322; G06Q 30/0641; G06F 17/0014; G06F 17/0042; G06F 17/40
USPC ....................................................... 705/7.21
See application file for complete search history.

(56) References Cited

U.S. PATENT DOCUMENTS

| | | | |
|---|---|---|---|
| 2008/0097781 A1* | 4/2008 | Clarke | G06Q 10/00 705/321 |
| 2017/0061411 A1* | 3/2017 | Sherman | G06Q 20/145 |
| 2017/0147984 A1* | 5/2017 | Zoia | G06F 16/9535 |

* cited by examiner

Fig. 4A

<        Register        NEXT

Step 2: Social Security Number

For authentication purpose, your Social Security Number is needed for a simple background check.

Social Security Number*

[ xxx ] - [ xx ] - [ xxxx ]

✓ Remains Private – never shared
✓ No credit check – credit won't be affected
✓ Information is secure & safe

Review the background check disclosure and authorization

Expand +

☐ By checking this box, I acknowledge and agree that I have read and understand this BACKGROUND CHECK DISCLOSURE and acknowledge that I have read, understand and agree with the statements contained in this BACKGROUND CHECK AUTHORIZATION. I agree that I am providing my electronic signature and that my electronic signature is binding just like a signature in ink.

← Register    NEXT

Step 3: Details

[+] Add a Profile Picture

Car to be used

_____

Car Licence Plate

_____

[+] Upload picture of Licence or Passport

I'm eligible to serve as a:

Body Guard

Security Officer

Security Guard

Private Investigator

Legal Process Server

Operating Mode :

Armed

Unarmed

Operating Dress Code :

Uniform

Plain Clothes

Fig. 5

> Register    NEXT

Step 4: Employment History

Current Employer

Name

Address

Contact Phone

Relationship

Past Employer

Name

Address

Contact Phone

Relationship

Fig. 6

Your appointment is completed

Katherine Gill

| START TIME | END TIME |
|---|---|
| 09 : 12 AM | 02 : 09 PM |

| | |
|---|---|
| Total Duration | 04:57 |
| Billable Hours | 5 |
| Billing Rate | $ 20 / hour |
| Sub Total | $ 130.00 |
| Book Fee | $ 30.00 |
| TOTAL | $ 160.00 |

GO TO MY BOOKINGS

Fig. 32

BOOKING SECURITY SERVICES

RELATED APPLICATION INFORMATION

This patent claims priority from provisional patent application No. 62/485,416, filed Apr. 14, 2017, entitled "Mobile, Computerized Security Services Booking," the contents of which are incorporated herein in their entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure describes systems and methods for computerized hiring of security professionals. More particularly, the system relates to an Internet-based matching system for assembling information about professional security professionals, categorizing the professionals, providing the information to potential clients via a mobile device application on a client's mobile device, and facilitating the client's hiring of on-demand, client selected security professionals.

Description of the Prior Art

The global computer network known as the Internet and World Wide Web has been utilized in a variety of cell phone and browser applications. GPS locating has been used as well. There is a need for a cell phone and browser accessible system to rapidly identify and connect various security professionals with clients on a real-time basis.

DESCRIPTION OF THE DRAWINGS

FIG. 4A is a mobile device application screen shot of a first screen of a security professional registration process.

FIG. 4B is a mobile device application screen shot of a portion of a second screen of a security professional registration process.

FIG. 4C is a mobile device application screen shot of a further portion of a second screen of a security professional registration process.

FIG. 5 is a mobile device application screen shot of a third screen of a security professional registration process.

FIG. 6 is a mobile device application screen shot of fourth screen of a security professional registration process.

FIG. 32 is a mobile device application screen shot of security professional review listing.

DETAILED DESCRIPTION

Introduction

The systems and methods described herein provide a computerized system for, from a client's perspective, locating, identifying, listing, selecting, hiring and paying security professionals. The systems and methods described herein provide a computerized system for, from a security professional's perspective, promoting security services, being listed as available for security services, receiving security services assignments, and receiving remuneration for providing security services. The systems and methods are provided through a cell phone or other mobile device application and/or Internet web browser over the Internet and involve real-time geographical location and availability features in conjunction with a server application program running on a server computer.

Through the mobile device applications, corporate and private security professionals are made available to potential clients via their cell phones in real-time. The client uses the client application to contact and direct selected security professionals to a location of choice. Convenient and inexpensive, the system and client application provide an easy way for a client to book security services. The client application may include a "Book Now" feature to immediately, in real-time connect a client with security professionals. The client application provides the client the ability to choose the type of security professionals that best fits the client's needs. The client application provides the client the ability to track the location and arrival of hired security professionals in real-time through GPS. The security professionals who participate include body guards, security guards, security officers, legal process servers, and private investigators.

The security professional application provides detailed reports of earnings to security professionals and payments from clients. By using the security professional application, security professionals instantly know how much they will earn in advance and can confirm their pay for an assignment. By using the client application, clients can instantly book and then pay selected security personal for an assignment.

System

Figure 1:
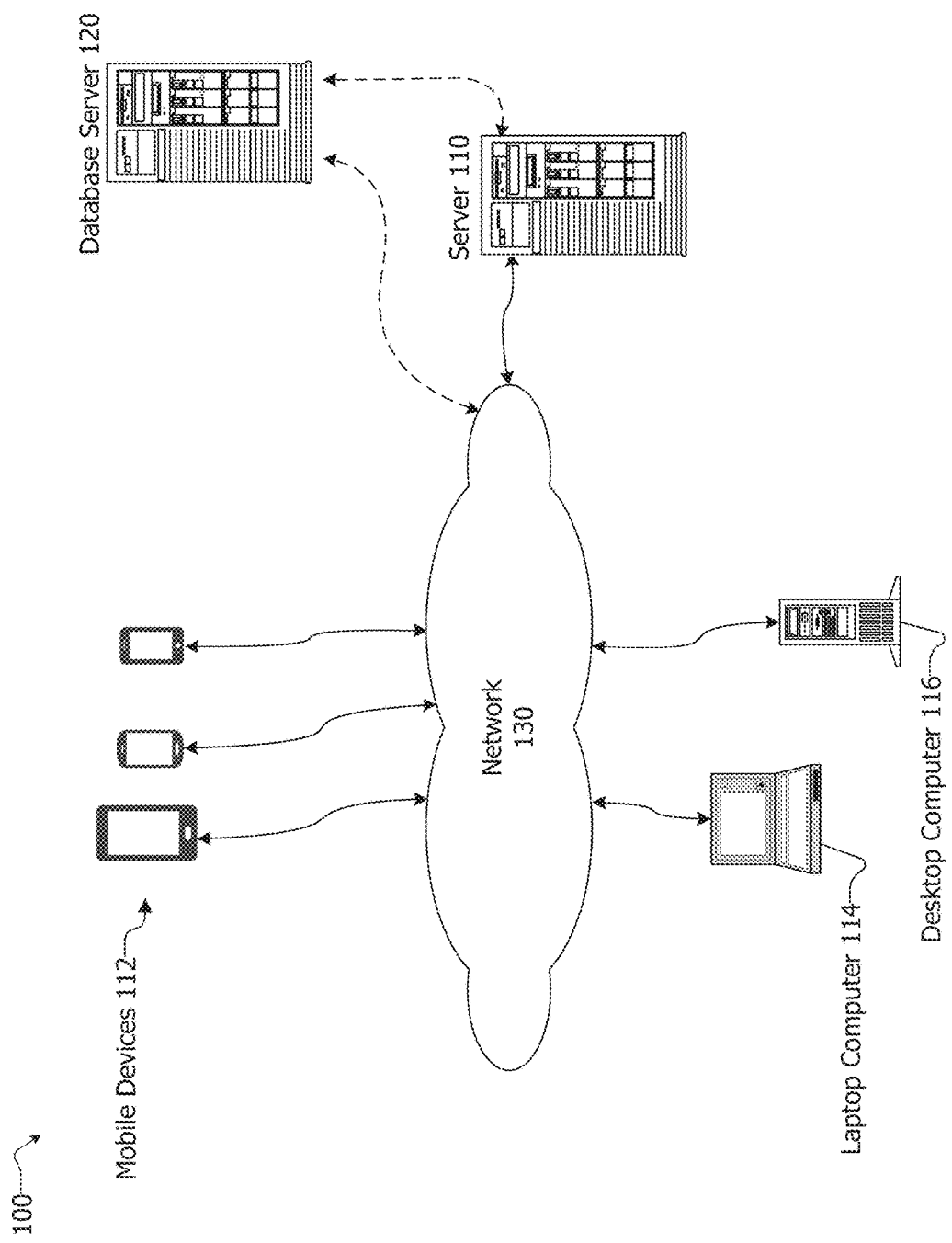
FIG. 1 is a block drawing of a computing environment in which the systems and methods may be implemented.

FIG. 1 is a drawing of a computing environment in which the systems and methods may be implemented. FIG. 1 is a drawing of a computing environment in which the methods may be implemented. The methods described herein are implemented in software that is stored in and executed in a multiple computing devices. A computing device as used herein refers to any device with a processor, memory and a storage device that executes instructions including, but not limited to, personal computers, desktop computers 116, server computers 110, mini-computers, mainframe computers, super computers, computer workstations, mobile devices 112 such as cell phone, smartphones, computing tablets, portable computers, and laptop computers 114. These computing devices may run an operating system, including, for example, variations of the Microsoft Windows, Linux, Android, and Apple Mac operating systems.

The software is stored on a machine readable storage medium in a storage device included with or otherwise coupled or attached to a computing device. That is, the software is stored in electronic, machine readable media. These storage media include, for example, magnetic media such as hard disks; optical media such as compact disks (CD-ROM and CD-RW), digital versatile disks (DVD and DVD±RW), and BLU-RAY; silicon based storage including solid state drives (or silicon storage devices) (SSDs) and flash memory cards; and other magnetic, optical, and silicon storage media. As used herein, a storage device is a device that allows for reading and/or writing to a storage medium. Storage devices include hard disk drives, SSDs, DVD drives, flash memory devices, and others.

The computing device includes software for providing functionality and features described herein. The computing device may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The components of the computing device may include specialized units, circuits, software and interfaces for providing the functionality and features described here. The processes, functionality and features described herein are embodied in whole or in part in software which operates on a computing device and may be in the form of firmware, an application program, an applet (e.g., a Java applet), a browser plug-in, a COM object, a dynamic linked library (DLL), a script, one or more subroutines, an operating system component or service, or a combination of these. The hardware and software and their functions may be distributed such that some components are performed by one computing device and others by other computing devices. The computing devices are coupled with and communicate with each other over a network 130. The environment may include specialized computing devices and software such as database software and one or more database servers 120. One or more security authentication services may be accessed via servers (not shown) provided by third parties to confirm and/or authorize the credentials of listed security professionals. The network 130 is the Internet, and may include one or more of each of a local area network (LAN), a wide area network (WAN), a packet-switched network, circuit-switched network, and may be a combination of these.

As implemented, the systems and methods herein include a client application program executing on multiple client mobile computing devices (112, typically cell phones), a security professional application program executing on multiple security professional mobile computing devices (112, typically cell phones), and a server application program running on one or more server computers (110), the server application being in communication with the client applications programs and the security professional application programs over the Internet (130). In some implementations, some initial information may be provided to the system by clients and/or security professionals via a web page on an internet browser running on a computing device such as a laptop (114) or desktop computer (116).

Processes

Figure 2:
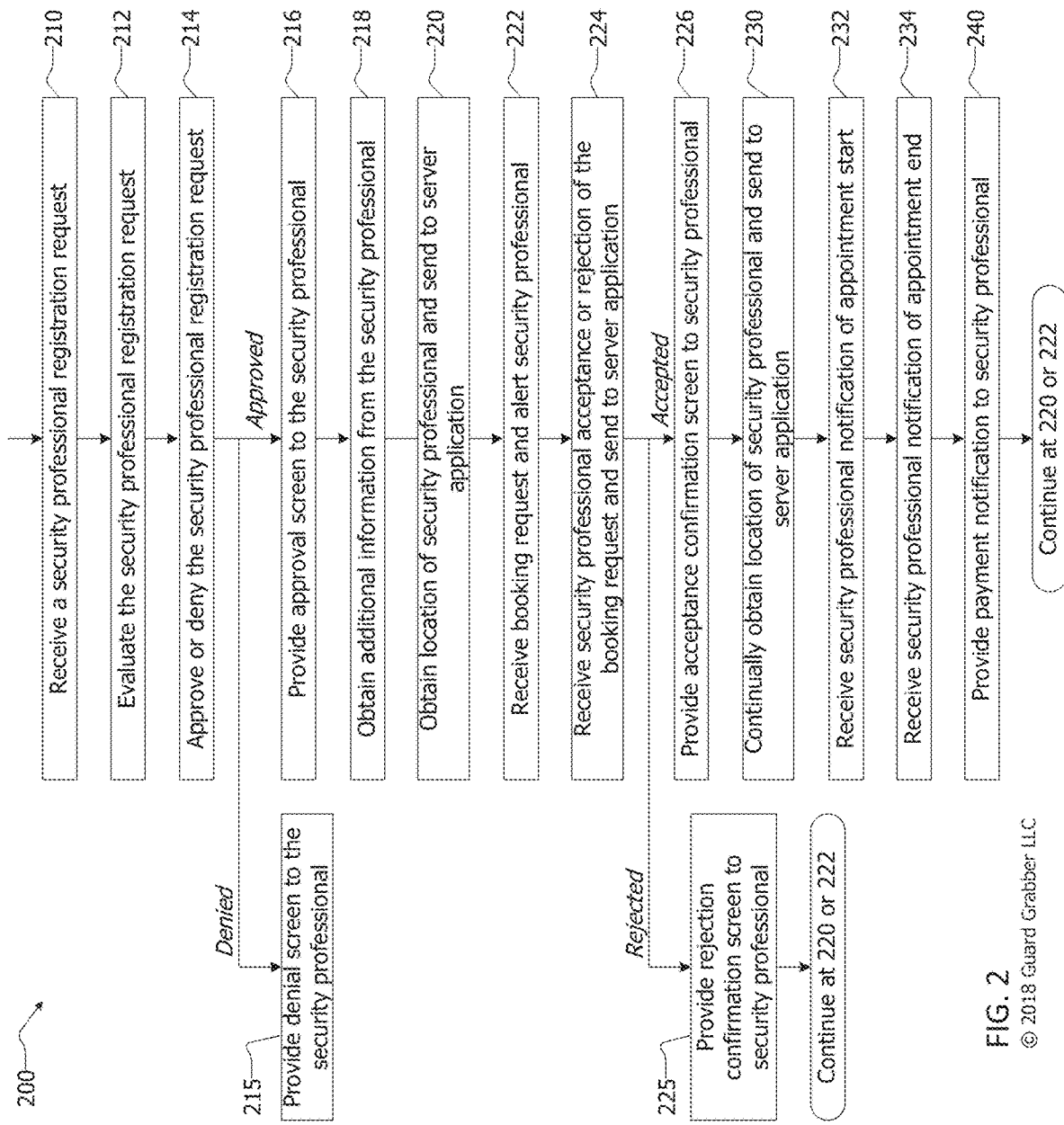
FIG. 2 is a flow chart of the actions taken by a security professional mobile device application program to register security professionals, obtain bookings for security professionals, and make payments to security professionals according to the systems and methods described herein.
Figure 3:
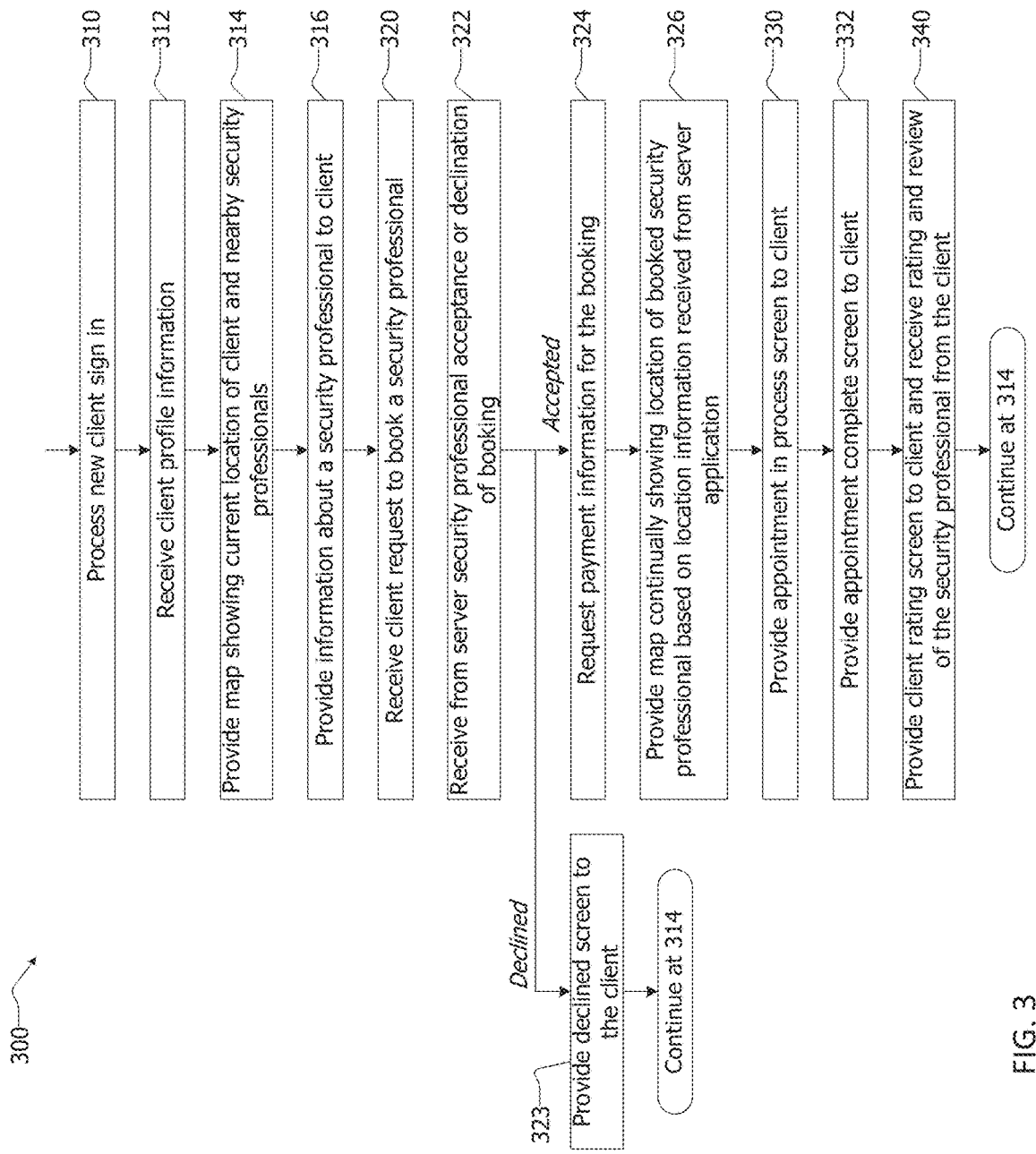
FIG. 3 is a flow chart of the actions taken by a client mobile device application program used by a client to review, select (hire) and pay security professionals according to the systems and methods described herein.

The methods described herein may operate on a combination of a web page, a security professional application program running on a mobile computing device, a client application program running on a mobile computing device, and a server application program running on a server. FIG. 2 is a flow chart 200 of the actions taken by a security professional mobile device application program to register security professionals, obtain bookings for security professionals, and make payments to security professionals according to the systems and methods described herein. FIG. 3 is a flow chart 300 of the actions taken by a client mobile device application program used by a client to review, select (hire) and pay security professionals according to the systems and methods described herein.

Figure 7:
FIG. 7 is a mobile device application screen shot of a profile under review screen.

Referring now to FIG. 2, when a security professional wishes to participate in the system and offer services in the system, the security professional must register with the system. This may be done via a web page but is more typically done via the security professional mobile device application. In response to a startup page or upon initial execution, the security professional application receives a security professional registration request (210). The registration information may be provided in response to multiple screens offered by the security professional application, as shown and described regarding FIGS. 4A, 4B, 4C, 5 and 6 below. The security professional application sends the registration information received from the security professional to the server application which evaluates the security professional registration request (212). The evaluation may be performed without human input by referring to third party authorization and verification services over the Internet. While this is occurring, an appropriate notification screen may be provided to the security professional as shown in FIG. 7 and described below. In some embodiments, the evaluation may be augmented with human input by the service provider or other third party review services. The registration information and other information about the security professional may be stored by the server application in a separate or included database that may be the database server 120 shown in FIG. 1.

The system either approves or denies the security professional registration request (214). The security professional application provides appropriate notification screens to the security professional. The security professional application provides a denial screen (215) or an approval screen (216) to the security professional as shown in and described regarding FIGS. 8 and 9 below. Upon approval, the security professional application may obtain additional information from the security professional (218). The security professional application then obtains the location of the security professional and sends the location to the server application (220). The security professional application obtains the location of the security professional by referring to the location information and GPS system on the mobile computing device of the of the security professional. The location is provided to the server application which stores the location information. This enables the server application to provide clients with nearby security professionals via the client mobile device application described below regarding FIG. 3.

Referring back to FIG. 2, the security professional application receives a booking request from the server and alerts the security professional (222). The security professional application may provide a listing of current booking requests to the security professional via a notification screen in the security professional application like that shown in FIG. 11 described below. This may be achieved by an appropriate screen and related audio or physical alerts such as a short song or melody played on the security professional's mobile computing device and/or vibrating the mobile computing device. The alert may be provided by the security professional application as a notification on the security professional's mobile device via the operating system on the mobile device. The security professional application then receives security professional acceptance or rejection of the booking request and sends the acceptance or rejection to the server (224). This may be achieved on a screen like that shown in FIG. 18. The security professional application may provide a rejection confirmation screen to the security professional (225). Similarly, an acceptance confirmation screen may be provided (226).

Now that the security professional has accepted a booking, the security professional travels to the appointment, namely to the location specified in the booking request. While the security professional is travelling to the booking appointment, the security professional application continually obtains the location of the security professional and sends it to the server application (230). During this time, the server application continually updates the client's application with the security professional's location so that client can track the location of the security professional via the client application on the client's mobile computing device.

When the security professional arrives at the booked appointment location, the security professional application may recognize the arrival and prompt the security professional to take action to affirm the beginning of the booking assignment. This affirmation may be done by clicking on a user interface element provided by the security professional application like that shown in FIG. 18 and described below. The security professional application receives security professional notification of appointment start (232). This information may be provided to the server application at this time. After the security professional has completed the assignment, the appointment is ended. This may be achieved by a security professional application provided screen like that shown in FIG. 19 and described below. The security professional application receives security professional notification of appointment end (234). At this time, the security professional application sends notification of the end of the appointment to the server application which initiates payment of the fee for service to the security professional. The security professional application provides a payment notification to the security professional (240) which may be like that shown in FIG. and described below. The flow of actions in the security professional application may continue at blocks 220 or 222, depending on the implementation, or may automatically provide an upcoming bookings screen like that shown in FIG. 10 and described below.

Referring now to FIG. 3, when a client wishes to hire, retain, or book a security professional, the client may do this by installing and executing a client mobile device application program. The client application provides a screen to process a new client sign in (310) and receives client profile information (312). This may be achieved by a screen like that shown and described regarding FIGS. 24 and 25 below. The client profile information and other information about the client may be stored by the server application in a separate or included database that may be the database server 120 shown in FIG. 1.

Figure 26:
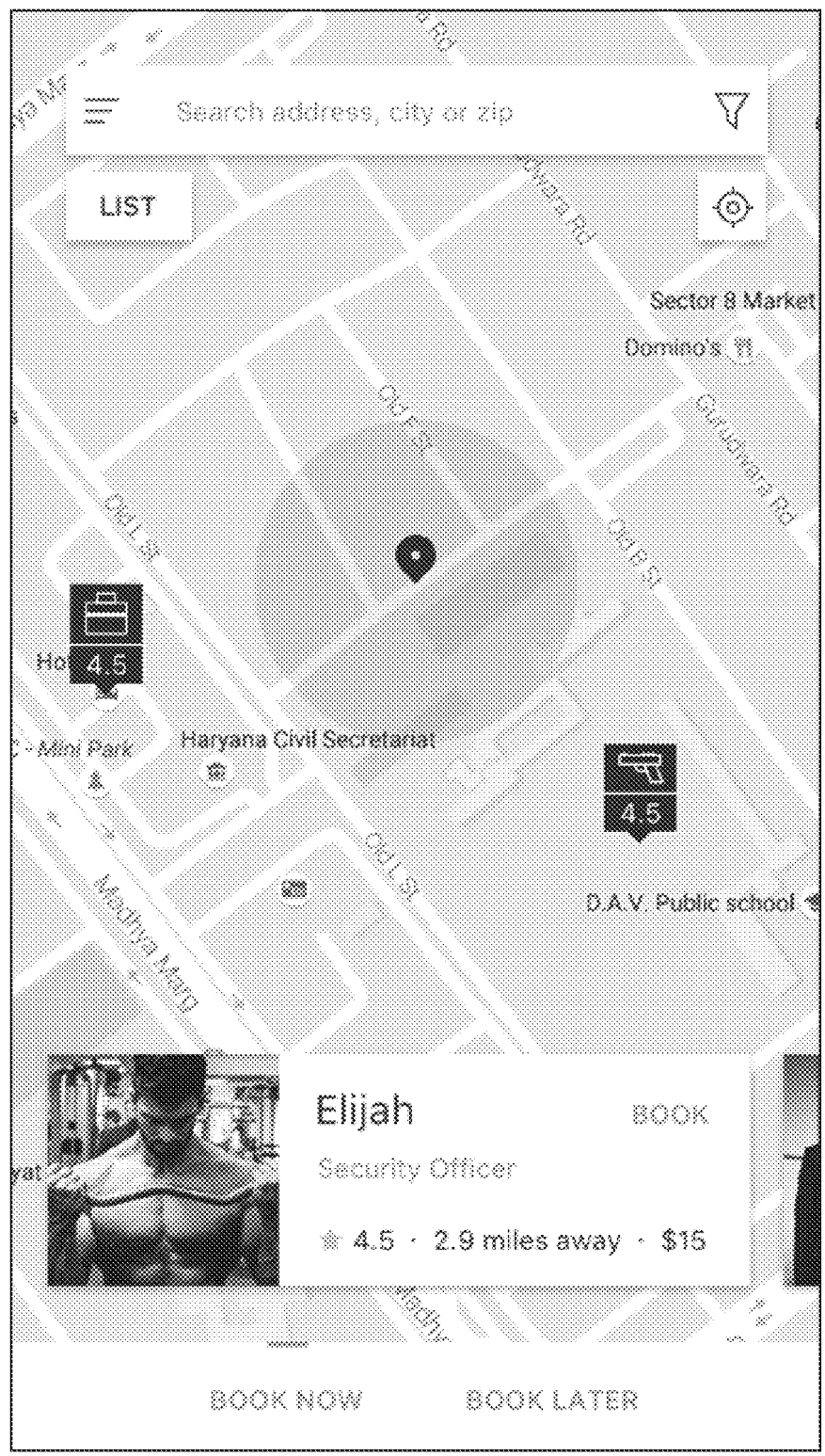
FIG. 26 is a mobile device application screen shot of a security professional tracking screen.
Figure 28:
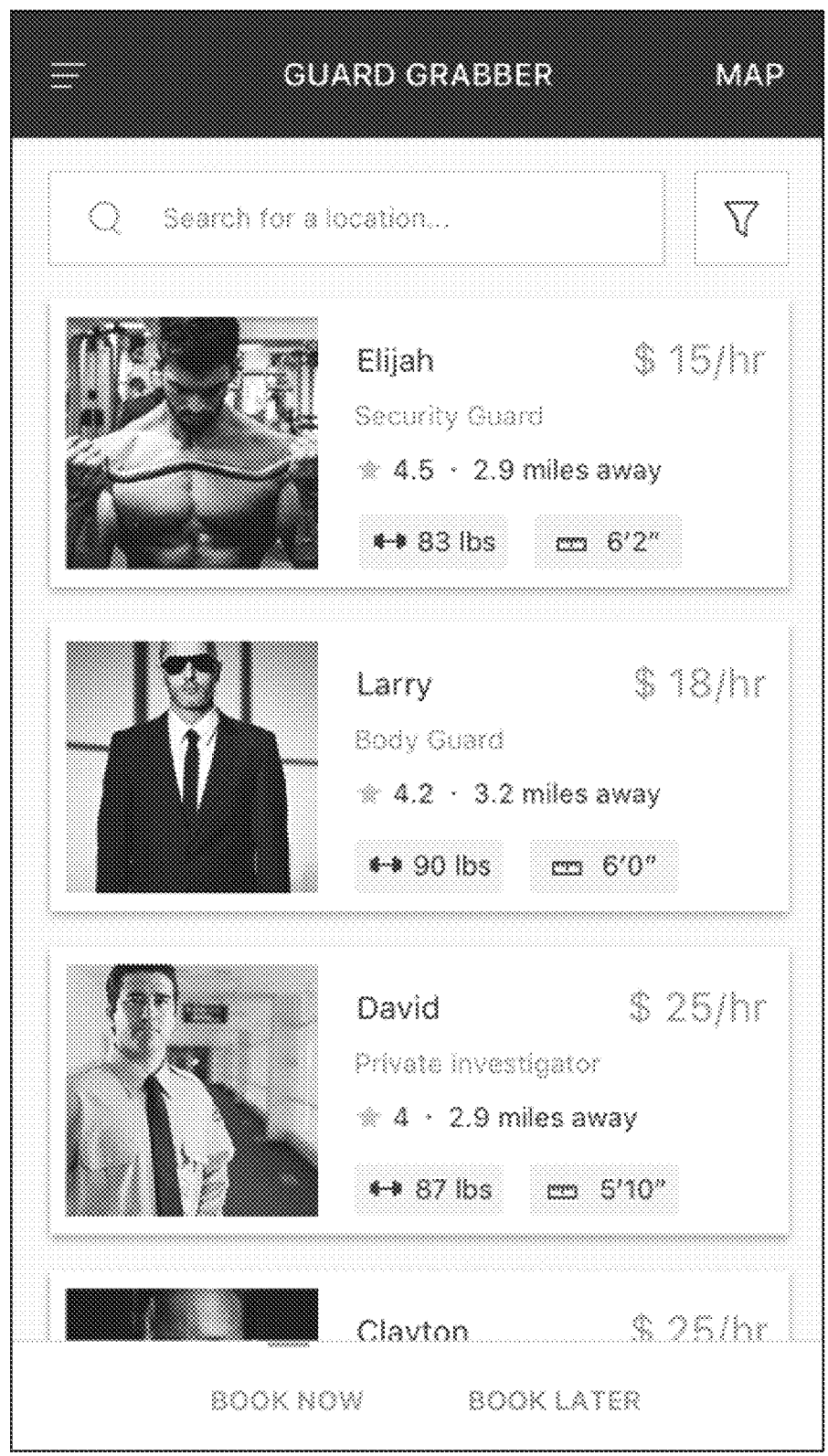
FIG. 28 is a mobile device application screen shot showing a list of security professionals.
Figure 29:
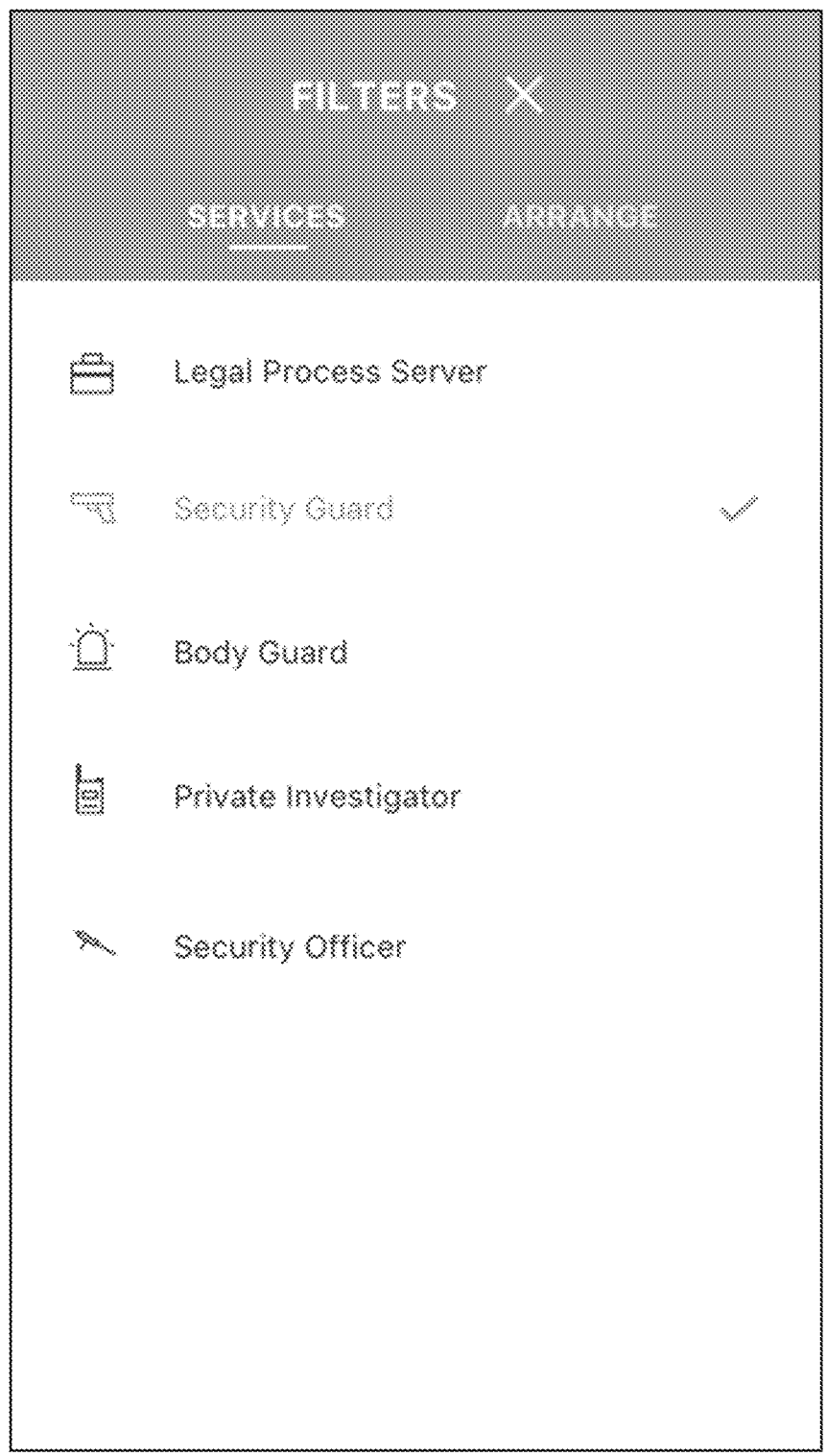
FIG. 29 is a mobile device application screen shot showing a security professional listing filter screen.
Figure 30:
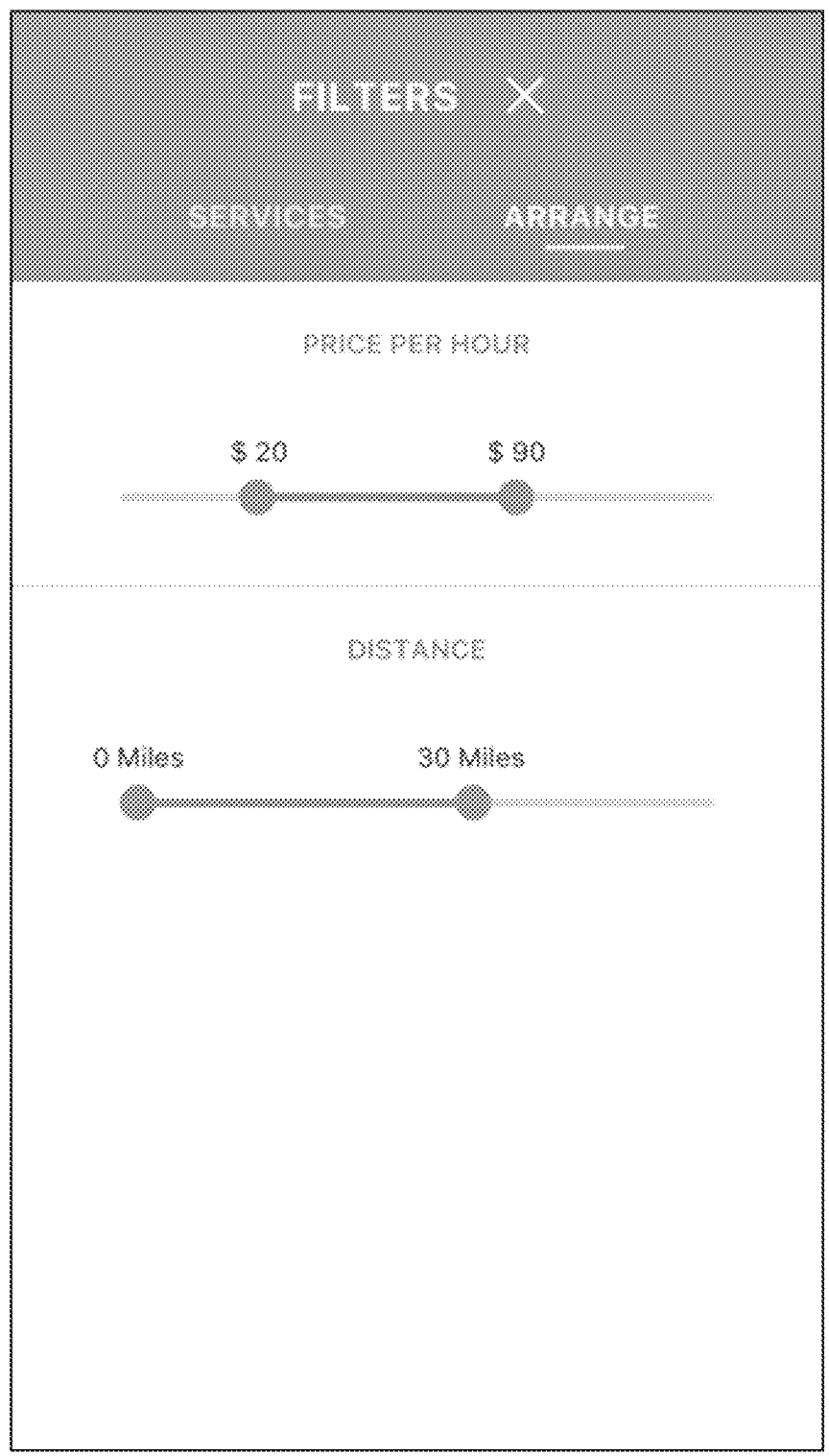
FIG. 30 is a mobile device application screen shot of a security professional listing arrangement screen.

After the client provides profile information, the client application provides a map showing the current location of the client and the location of nearby security professionals (314). The client application obtains the client location from location services such as GPS services available via the client's mobile computing device and/or the operating system included therein. The client application obtains the locations of nearby security professionals from the server application. The client application may send a request over the wireless Internet specifying the client's location, and in response, the server application provides information including location information about security professionals near the client. An example map showing the location and nearby security professionals is shown in FIG. 26 and described below. When the client clicks on or hovers over (depending on the implementation) a security professional icon on the map, the client application provides information about a security professional to the client (316) as a graphical pane or business card incorporated on a lower portion of the map or on top of the map (depending on the implementation), as shown in FIG. 26. The map screen may also allow the client to list business cards of nearby security professionals on a new screen, as shown in FIG. 28 which results from the client activating the list button shown in FIG. 26. The client application may allow the client the ability to filter the listing and map showing of nearby security professionals based on the kind of services needed as shown in FIG. 29 and the hourly rate and/or distance nearby as shown in FIG. 30.

A full screen of information on a security professional may be provided in response to a client activating links or clicking on icons or images in the map screen FIG. 26 or the listing screen FIG. 28. The client application also provides buttons, active text links or other user interface item allowing the client to book the selected security professional as shown in the bottom portion of FIGS. 26 and 28. Via this interface, the client application receives a client request to book a security professional (320). The information needed to place the booking may be received by the client application providing screens like those shown in FIGS. 27 and 33. The booking request is by the client application to the server which forwards it to the security professional application for acceptance or declination by the security professional. The client application receives from the server application security professional acceptance or declination of the booking (322). The client application provides a declined screen to the client when the booking is declined by the security professional (323). The flow of actions may continue at block 314 with the map screen.

Figure 33:
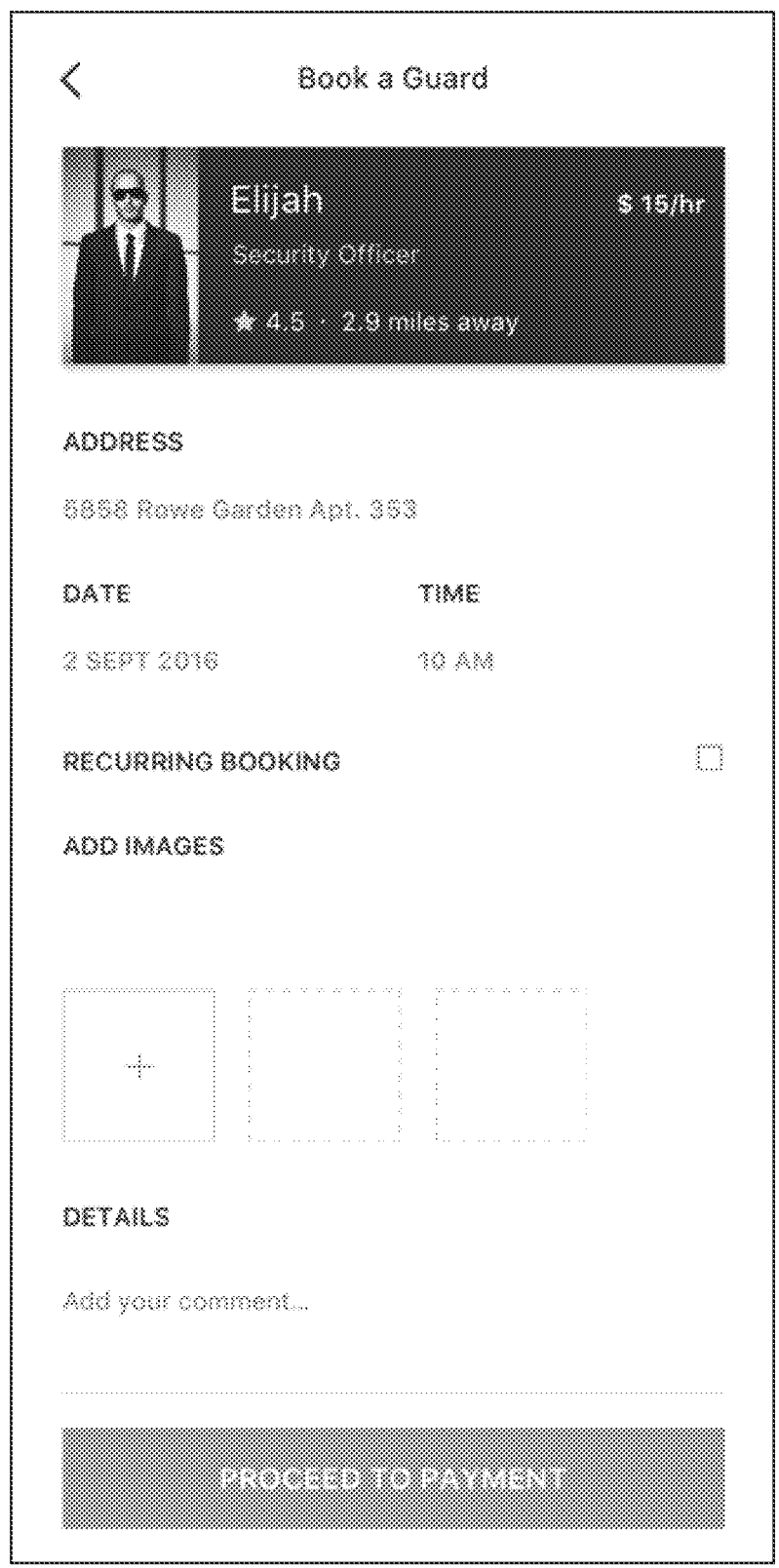
FIG. 33 is a mobile device application screen shot of a booking screen.
Figure 34:
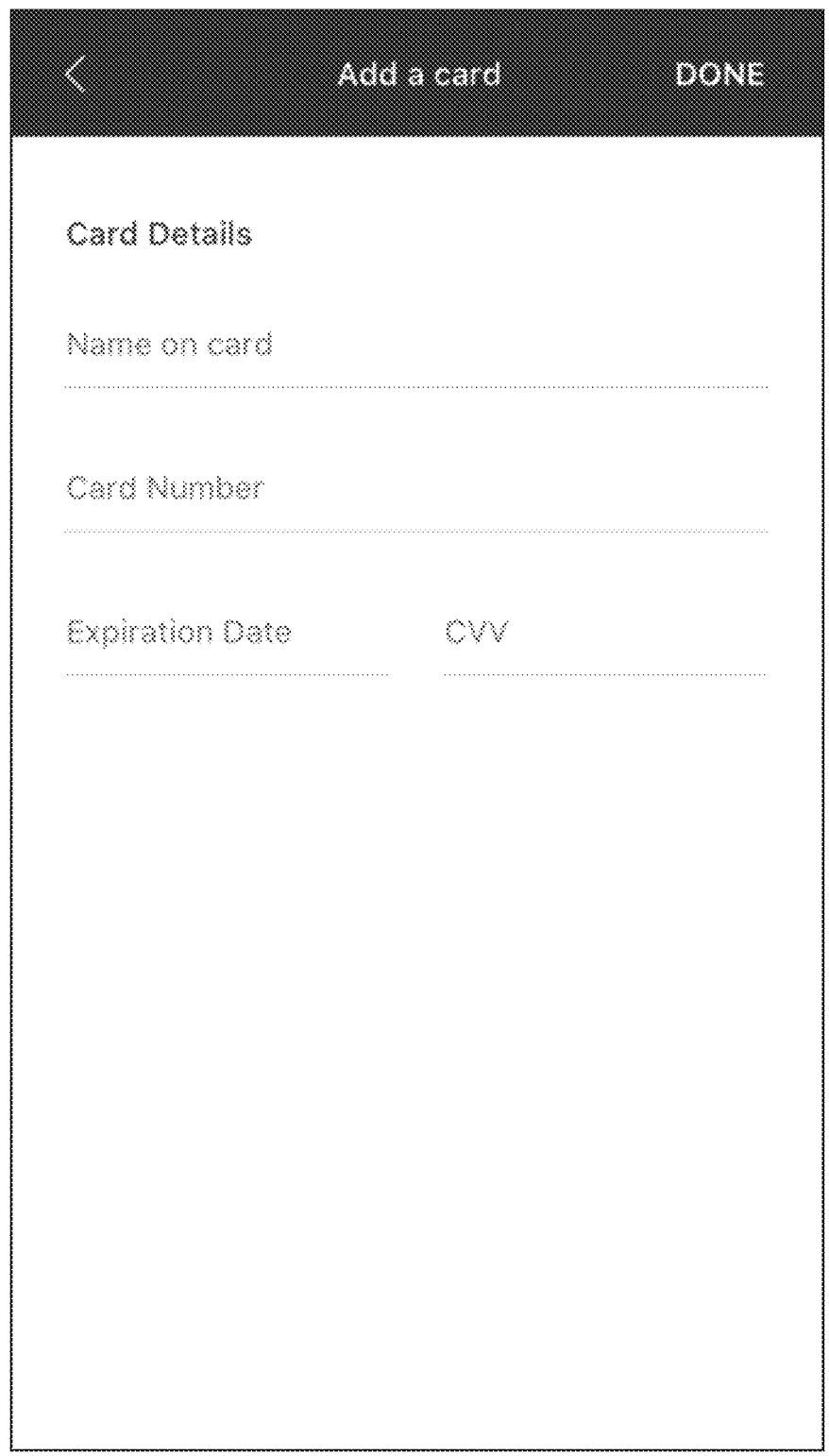
FIG. 34 is a mobile device application screen shot showing a credit card specification screen.
Figure 35:
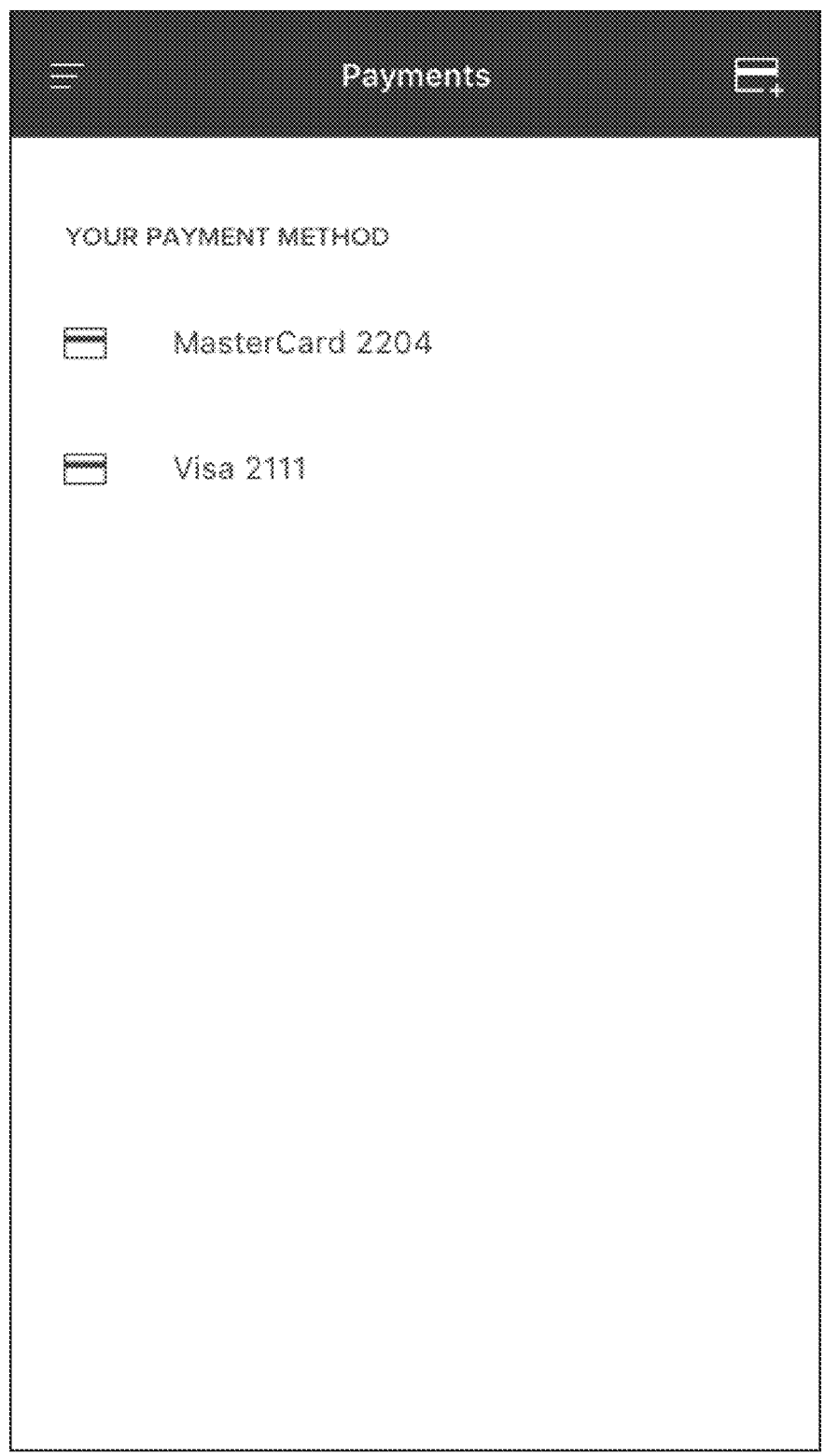
FIG. 35 is a mobile device application screen shot showing a payment method selection screen.

When the security professional accepts the booking, payment information or actual payment for the booking may be required at the time of booking (324) and may be obtained by the client application providing screens like those shown in FIGS. 33, 34 and 35. After the booking is made, the client application provides a map continually showing the location of the booked security professional based on location information received from server (326). When the security professional arrives at the location of the booking appointment, the booking appointment begins, and the client application may provide an appointment in process screen to the client, which may be like the screen shown in FIG. 37 and described below. When the booking appointment ends, the client application provides an appointment completed screen to client like that shown in FIG. 39 and described below. The appointment complete screen may provide a link, button or other graphical user interface item allowing the client to rate and review the security professional. The client application provides a client rating screen to the client and receives rating and review of the security professional from the client (340). This may be achieved using screens like those shown in FIGS. 40 and 41 and described below. The client application provides the review and rating to the server application which stores the review and rating information. This may be achieved by a database included with or augmenting the server application on a separate server. The flow of actions may continue at block 314 with the map screen.

The screen shots referenced above as well as others and related and additional functionality are now described.

Figure 4A:
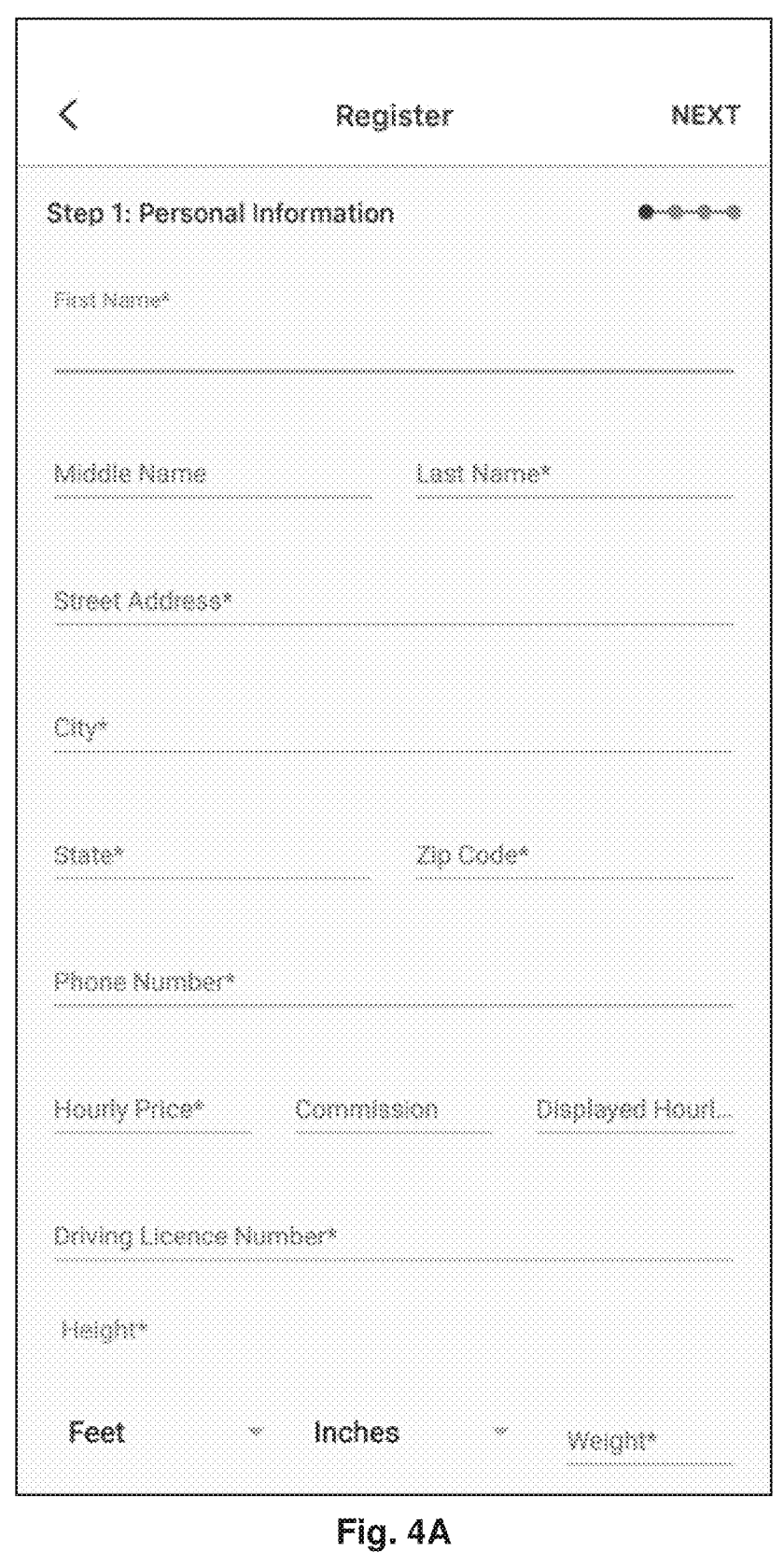

Referring now to FIG. 4A, a mobile application screen shot of a first screen of a security professional registration process is shown. During the registration process, the security professional application (or web page) provides a screen that requires the security professional to enter basic information such as name, address, city, and state. In addition, height and weight may be requested by the security professional application. The security professional intake process also requests, as pertinent to the particular kind of professional, driver's license number, social security number, professional license number(s), job experience, references, and the like. The registration process may also request or require the professional's desired hourly rate of pay, a minimum and/or maximum rate of pay, and other monetary details as pertinent. In addition, the registration process may request preferred work hours or available hours, preferred geography, such as not further from a specified number of miles from a particular zip code or town/city, maximum work period of time, minimum work period of time, and others.

Referring now to FIG. 4B, a mobile device application screen shot of a portion of a second screen of a security professional registration process is shown. On this screen, the security professional is requested to enter their social security number for background check purposes and to agree to disclosure and authorization for a background check. As mentioned above, license numbers and other certifications may also be requested on this screen or a related other screen. FIG. 4C is mobile device application screen shot of a further portion of a second screen of a security professional registration process showing the details of a background check disclosure and authorization, a continuation of the screen shot of FIG. 4B.

Referring now to FIG. 5, a mobile device application screen shot of a third screen of a security professional registration process requiring and accepting a security professional profile picture, automobile information, including the option to display a photo of the security professional's vehicle, including the license plate or passport numbers, and the types of services the service professional can provide. These services are listed by the security professional application (or web page), and one or more may be selected by the security professional as appropriate, including: Body Guard, Private Investigator, Process Server, Security Officer, Security Guard and whether those services include armed, unarmed, plain clothes or in uniformed, as applicable.

FIG. 6 is a mobile device application screen shot of fourth screen of a security professional registration process requiring the professional to input their employment history, including their current employer, if any, and their past employer, if any. The information required on this screen may include the name and address of the employer(s), as well as the current status of the security professional with the employer(s) and the name and contact information for a reference or supervisor at the employer(s).

FIG. 7 is a mobile device application screen shot of a profile under review screen provided to security professionals after submitting their application, indicating that the applicant's profile is under review.

Figure 8:
FIG. 8 is a mobile device application screen shot declining the application of a security professional.

FIG. 8 is a security professional mobile device application screen shot declining the application of a security professional. The screen may include a brief message, and, in other implementations, may include a reason for why the professional was declined participation in the service. The screen may provide user interface elements for the security professional to contact managers or administrators of the service or to logout.

Figure 9:
FIG. 9 is a mobile device application screen shot of a profile approval screen.

FIG. 9 is a mobile device application screen shot of a profile approval screen provided to a security professional when an application has been accepted. The screen may provide congratulations and a user interface element directing the security professional to proceed with using the system. In the version of the screen shown, the direction to use the system is the phrase "Let's Start," which when clicked on or otherwise activated takes the security professional to a security professional home screen or a "My Bookings" screen like that shown in FIG. 10.

Figure 10:
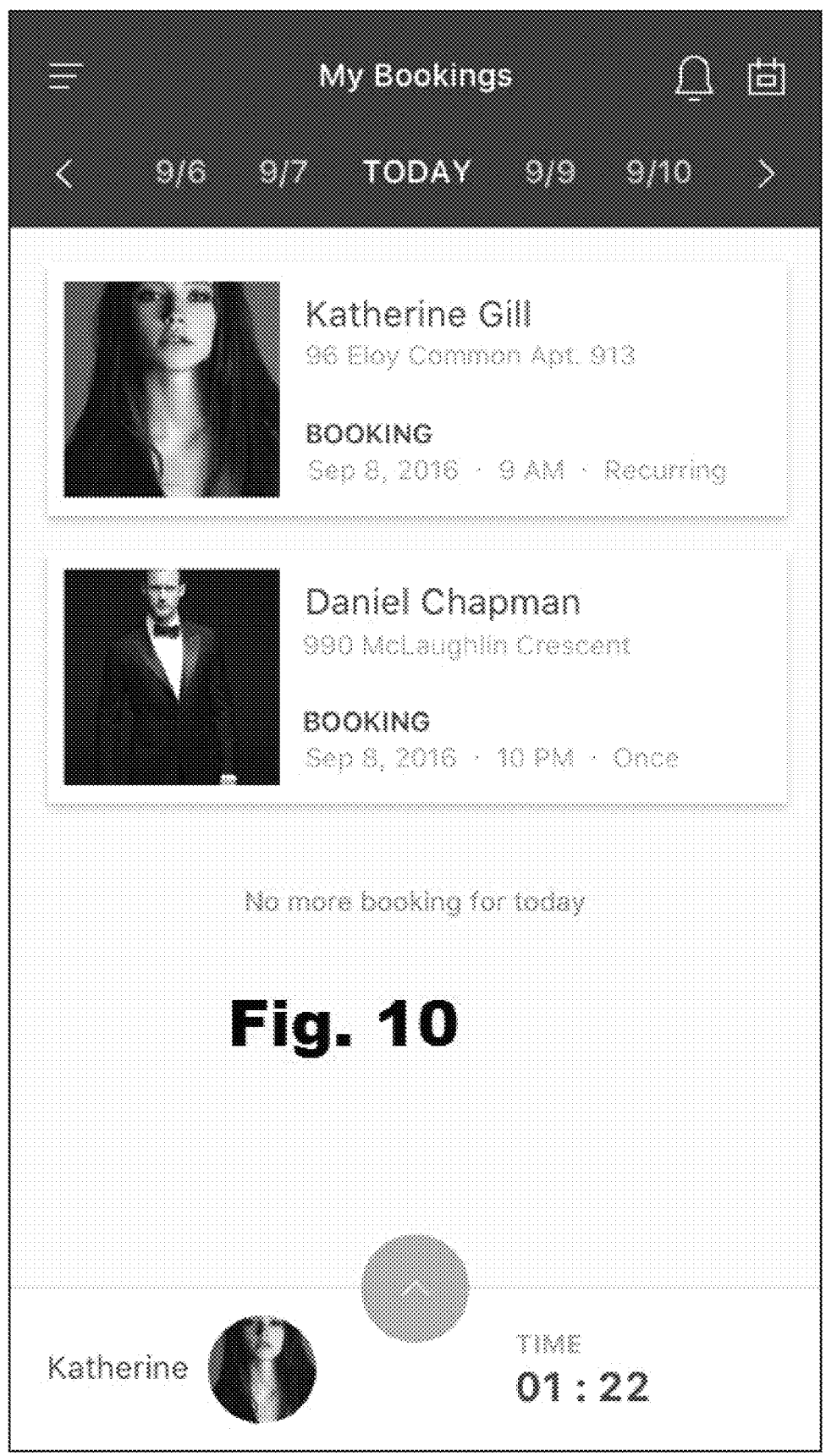
FIG. 10 is a mobile device application screen shot of a "My Bookings" screen.

FIG. 10 is a mobile device application screen shot of a security professional application "My Bookings" screen. The "My Bookings" lists client requests and client jobs for review by the security professional. This listing may provide current and future bookings, and may also provide past bookings. The booking entries in the booking listing may include the name of the person requesting the service which may also include a photo and other pertinent client information, and particulars of the services requested such as time, date, duration (typically in hours), place (address), the kind of type of service requested, and whether one time or recurring service. The user interface of the screen may be arranged by date such that a horizontal date bar is provided toward the top of the screen, and selecting a date provides the client requests and/or bookings for that particular date.

Figure 11:
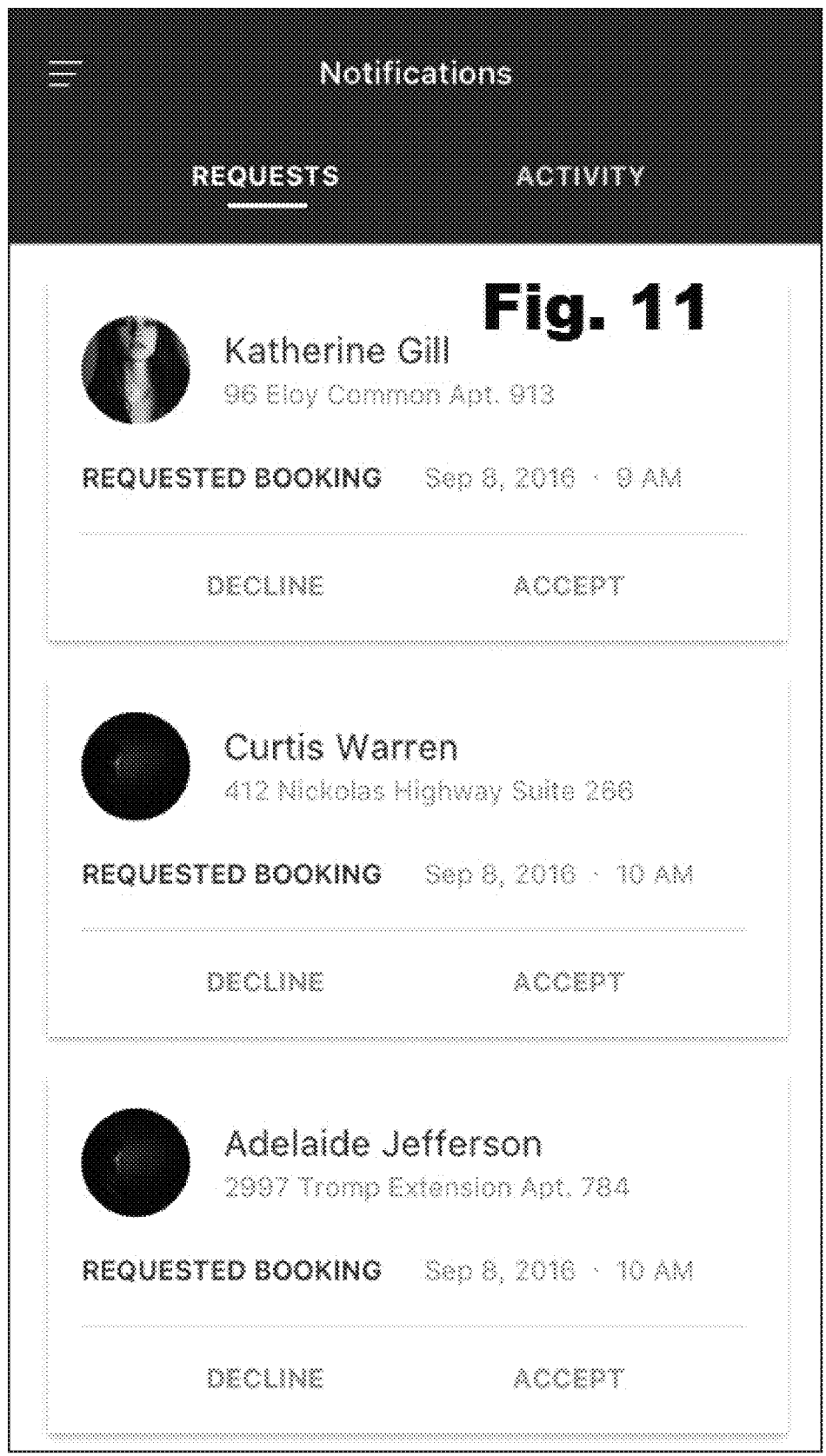
FIG. 11 is a mobile device application screen shot of a "Notifications" screen showing client requests.
Figure 12:
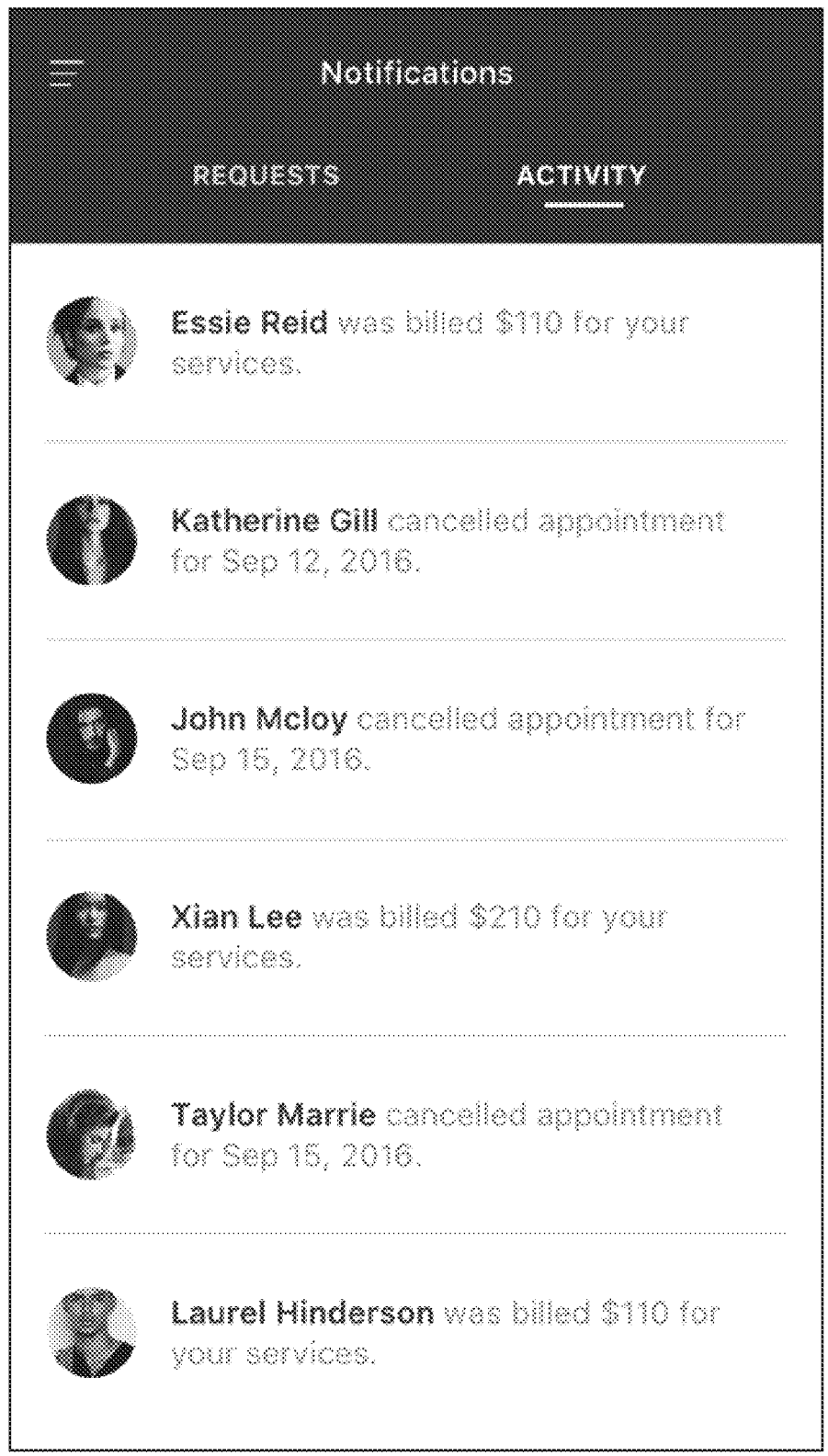
FIG. 12 is a mobile device application screen shot of a "Notifications" tab showing an activity log for the security professional.

Referring now to FIG. 11, there is shown a security professional mobile device application screen shot of a "Notifications" screen which lists client requests for services with user interface elements to decline or accept the client request. On the upper portion of the screen, "activity" and "requests" user interface elements are provided. When the "requests" user interface element is selected, the security professional application screen shot shown in FIG. 12 is provided with a listing of an activity log for the security professional and text describing whether the security professional billed the client for a service or canceled. The billing information may include the amount of funds earned by the security professional for the services provided. When a cancellation is made, the date the security professional cancelled may be listed.

Figure 13:
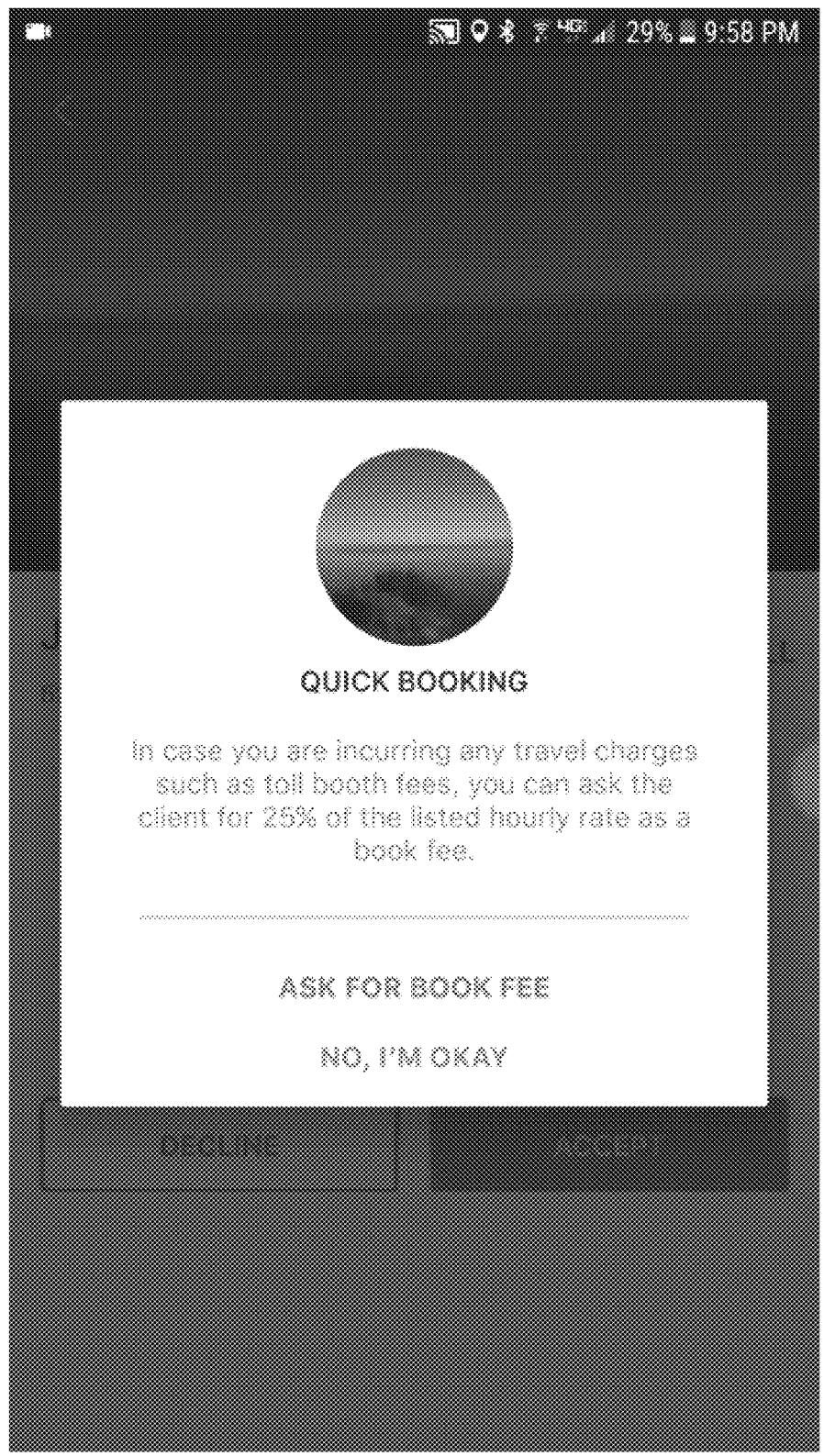
FIG. 13 is a mobile device application screen shot of a "quick booking" screen.
Figure 39:
FIG. 39 is a mobile device application screen shot of a completed appointment screen.

Referring now to FIG. 13, a mobile device application screen shot of a security professional "quick booking" screen is shown. This screen of the security professional application allows the security professional to request a booking fee in certain special circumstances. The booking fee may be, in one implementation, a one-time charge for the booking to be paid to the security professional, which may be, in one implantation, an amount equal to 25% of one hour of pay for the security professional as shown in the appointment completed client screen in FIG. 39. In other implementations the booking fee may a flat rate such as $10, $22, $84 or some other amount based on special circumstances. The special circumstance may be to cover special travel costs and/or other fees incurred by the security professional, such as, for example, a highway or travel toll, costs for special equipment or materials, and like. This could be added by the security professional using the quick booking screen on the security professional application. The booking fee is communicated by the security professional application to the server application which in turn communicates the booking fee to the client application which presents the booking fee along with the security professional's hourly rate to the client, as shown in FIG. 39 and described below.

Figure 14:
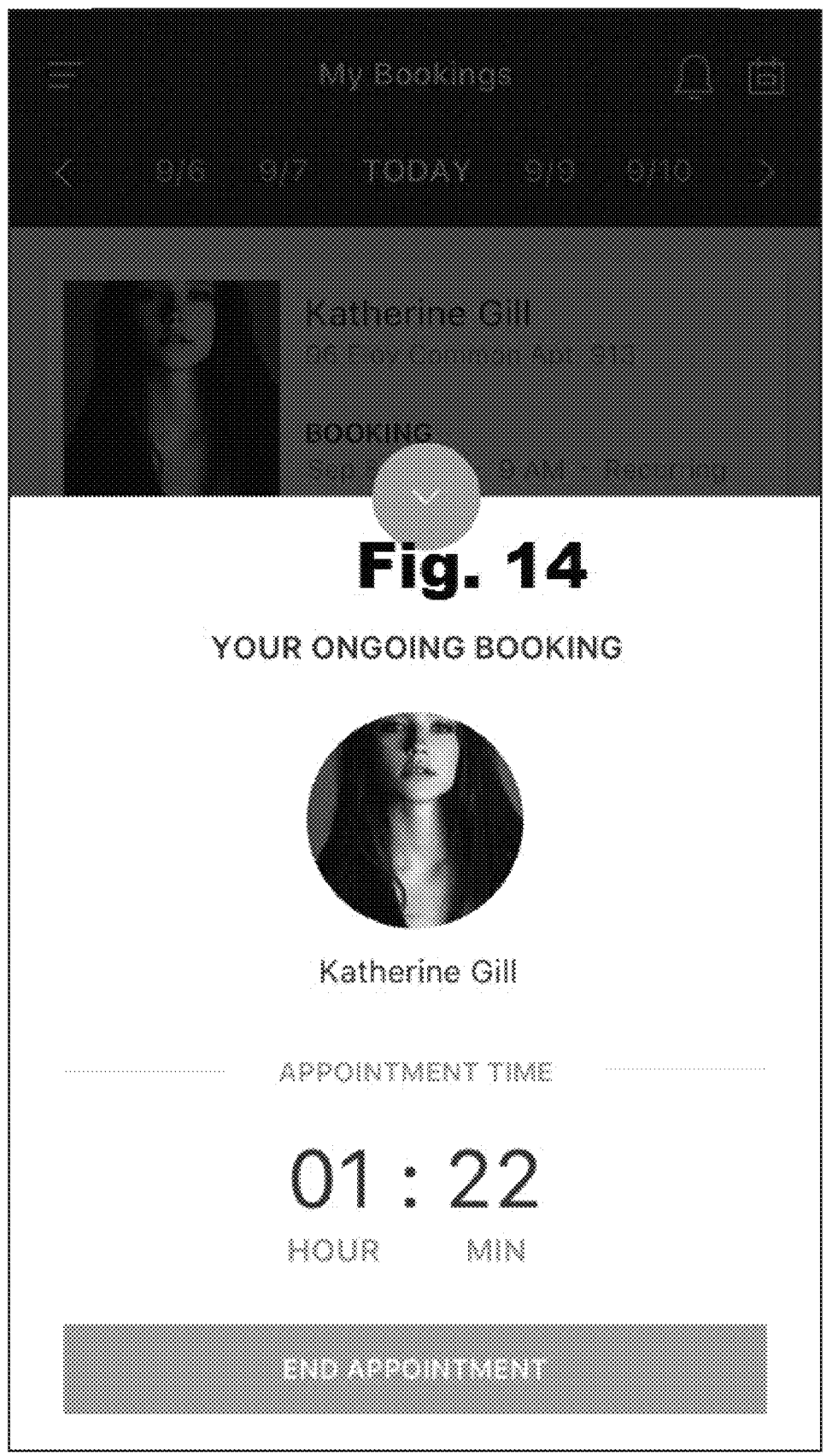
FIG. 14 is a mobile device application screen shot of an "ongoing booking" screen.

Referring to FIG. 14, there is shown a mobile device application screen shot of an "ongoing booking" screen which provides the security professional the amount of time expended in real-time for a booking. The time provided may be a count-down until the end of a requested service or may be a time counter, incremented as time passes, depending on the particular service or the implementation. The screen may provide the ability to end the booking appointment or service at the conclusion of the service via a user interface item such as linked text or a button.

Figure 15:
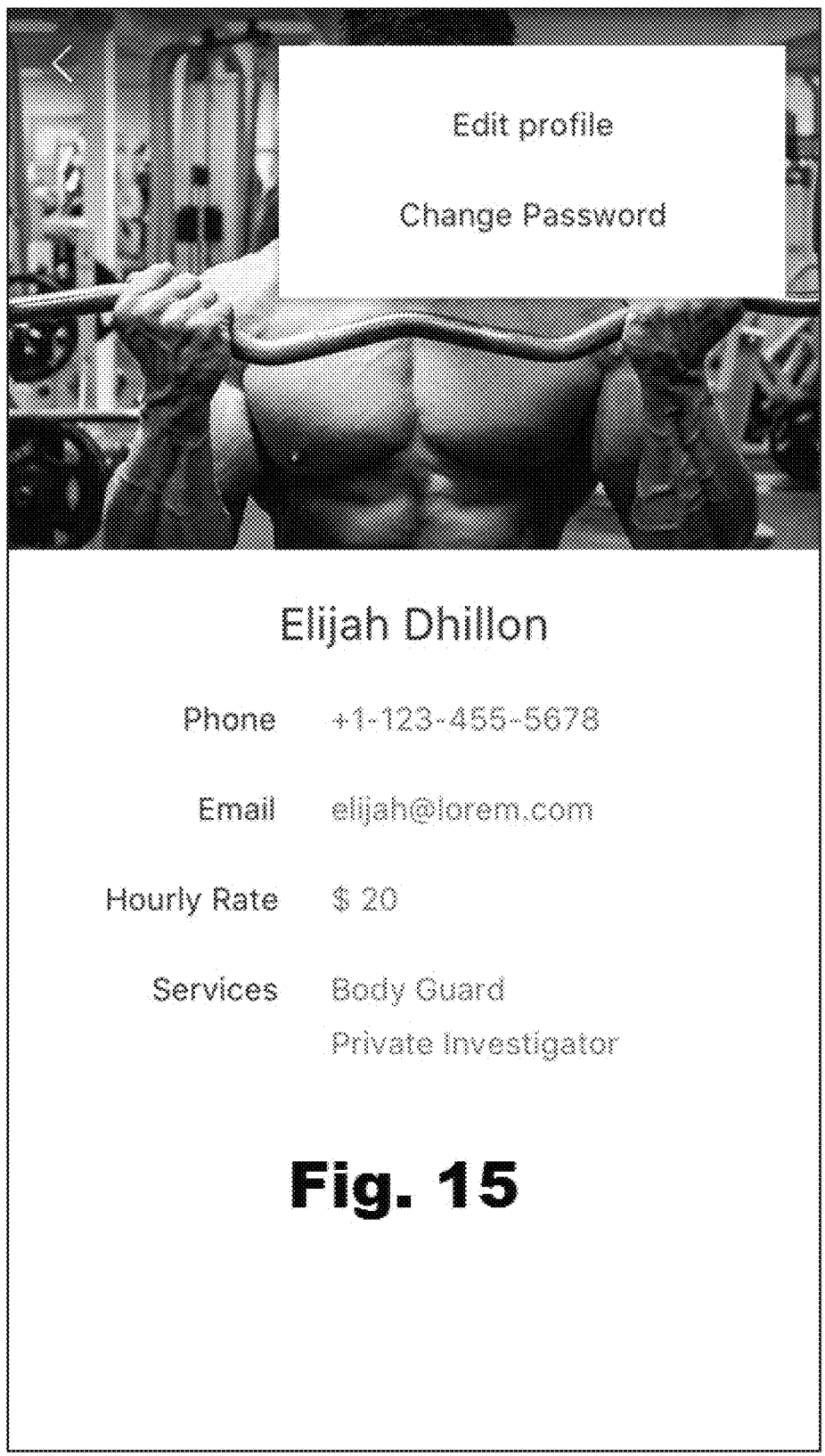
FIG. 15 is a mobile device application screen shot of an "edit profile" screen.

Referring now to FIG. 15, a mobile device application screen shot of an "edit profile" screen is shown. The security professional application provides this screen to give the security professional the ability to edit their profile or make changes to the password used to login. The screen displays the current information for the security professional including name, phone number, email address, hourly rate and services provided. The user interface enables the security professional to click on the "edit profile" user interface element to then update the text fields in the security professional's profile.

Figure 16:
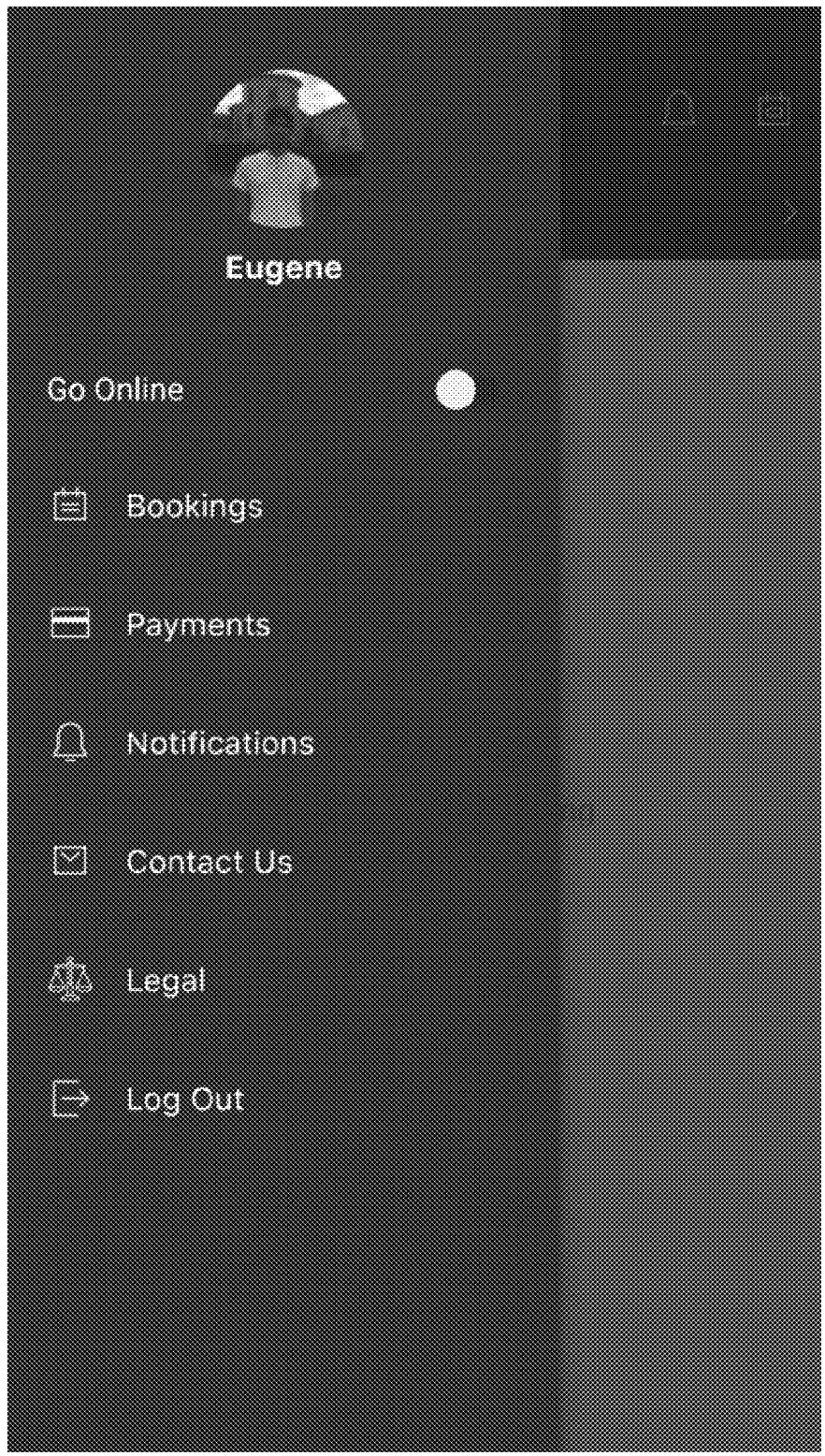
FIG. 16 is a mobile device application screen shot of a security professional's "control panel."

Referring now to FIG. 16, a mobile device application screen shot of a security professional's "control panel" screen is shown. The "control panel" screen provides the security professional with the ability to view bookings, payments, notifications, as well as user interface elements that allow the security professional to contact support, review legal information about the service and app, and the ability to logout. A user interface element allowing the security professional to "go online or "go offline" may also be provided. This allows the security professional to be seen or hidden from prospective clients. In this way, the security professional application allows the security professional the ability to opt out of on-demand, real-time location based bookings. In this circumstance, the security professional will remain in search results for future searches, and may be available for location based bookings based on a zip code, city name or other security professional specified (rather than live, GPS-based) geographical designation.

Figure 17:
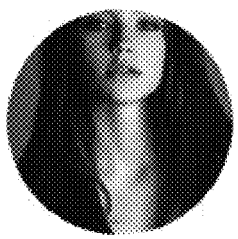
FIG. 17 is a mobile device application screen shot of a completed appointment screen.

Referring to FIG. 17, a mobile device application screen shot of a completed appointment screen is shown. This screen is provided by the security professional application to a security professional after the conclusion of a booked service. The completed appointment screen may show the start time and end time including the total duration of billable hours, the per hour billable rate, a subtotal of what is owed, and a voluntary booking fee if elected to be charged by the security professional summing up a total cost to the client for the services provided, with the ability to go to bookings for the services of other clients. This screen is provided after a security professional selects the "end appointment" user interface element in the "ongoing booking" screen shown in FIG. 14.

Figure 18:
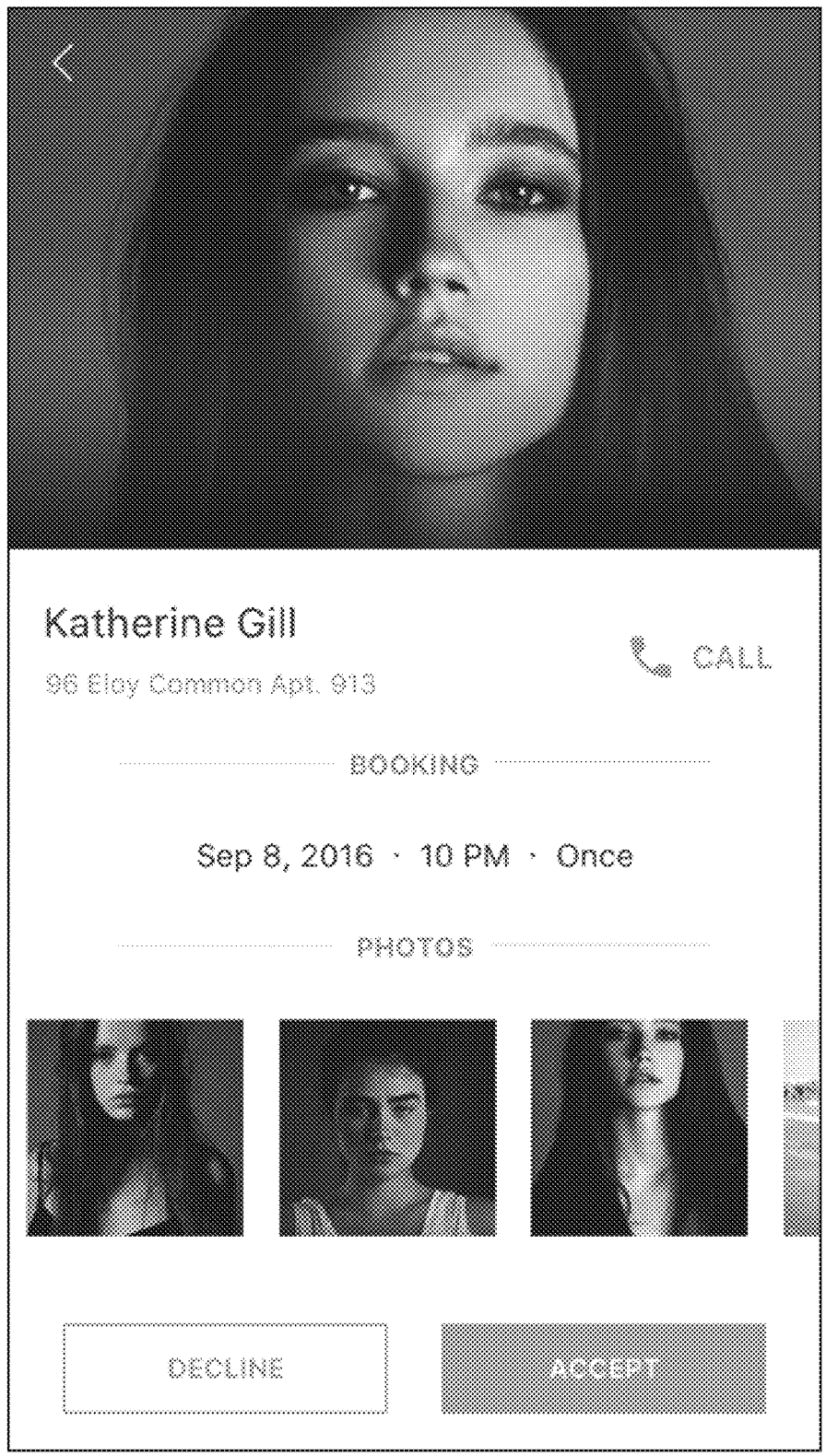
FIG. 18 is a mobile device application screen shot of a client booking request screen.
Figure 19:
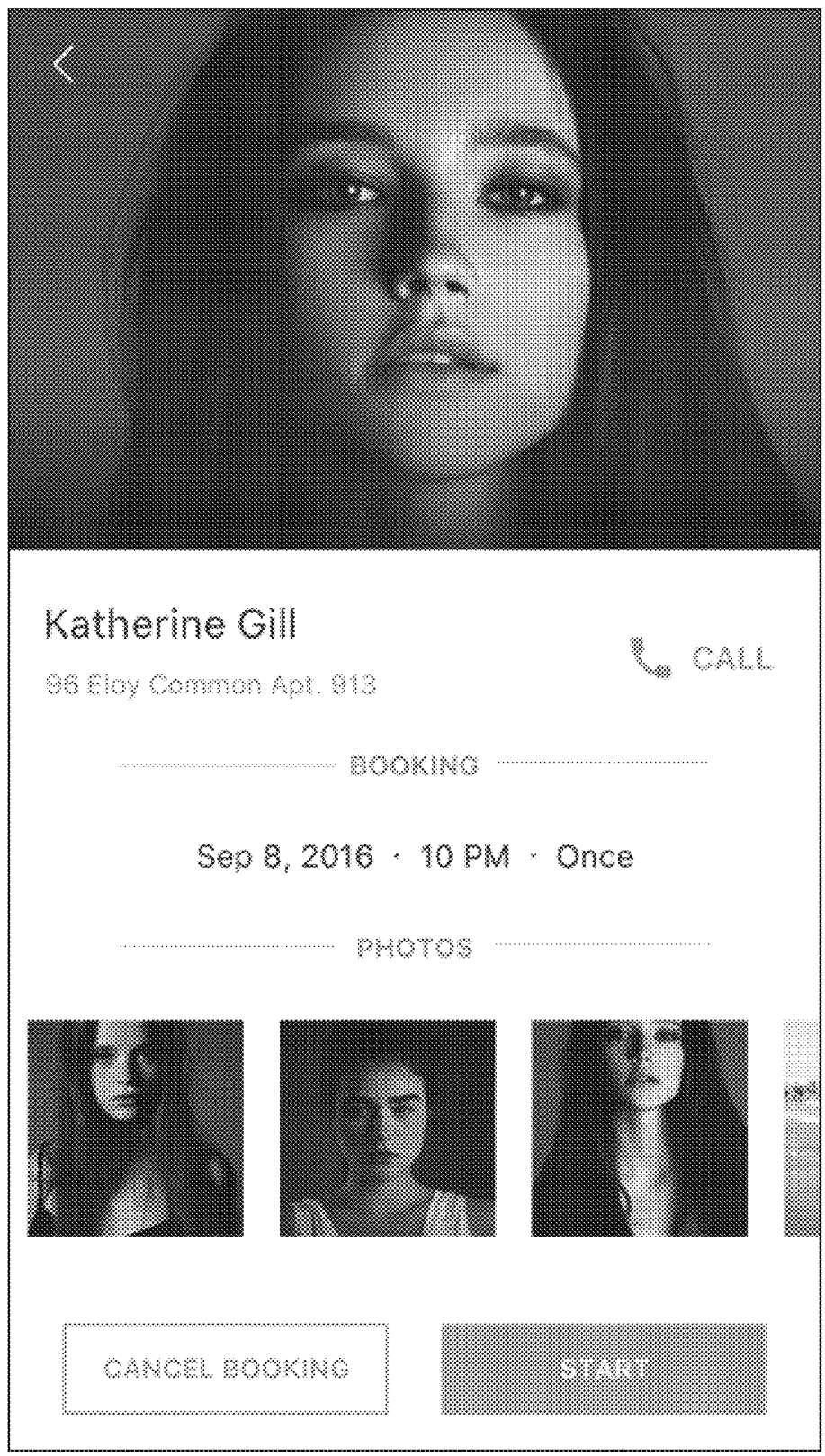
FIG. 19 is a mobile device application screen shot of a booking acceptance screen.
Figure 20:
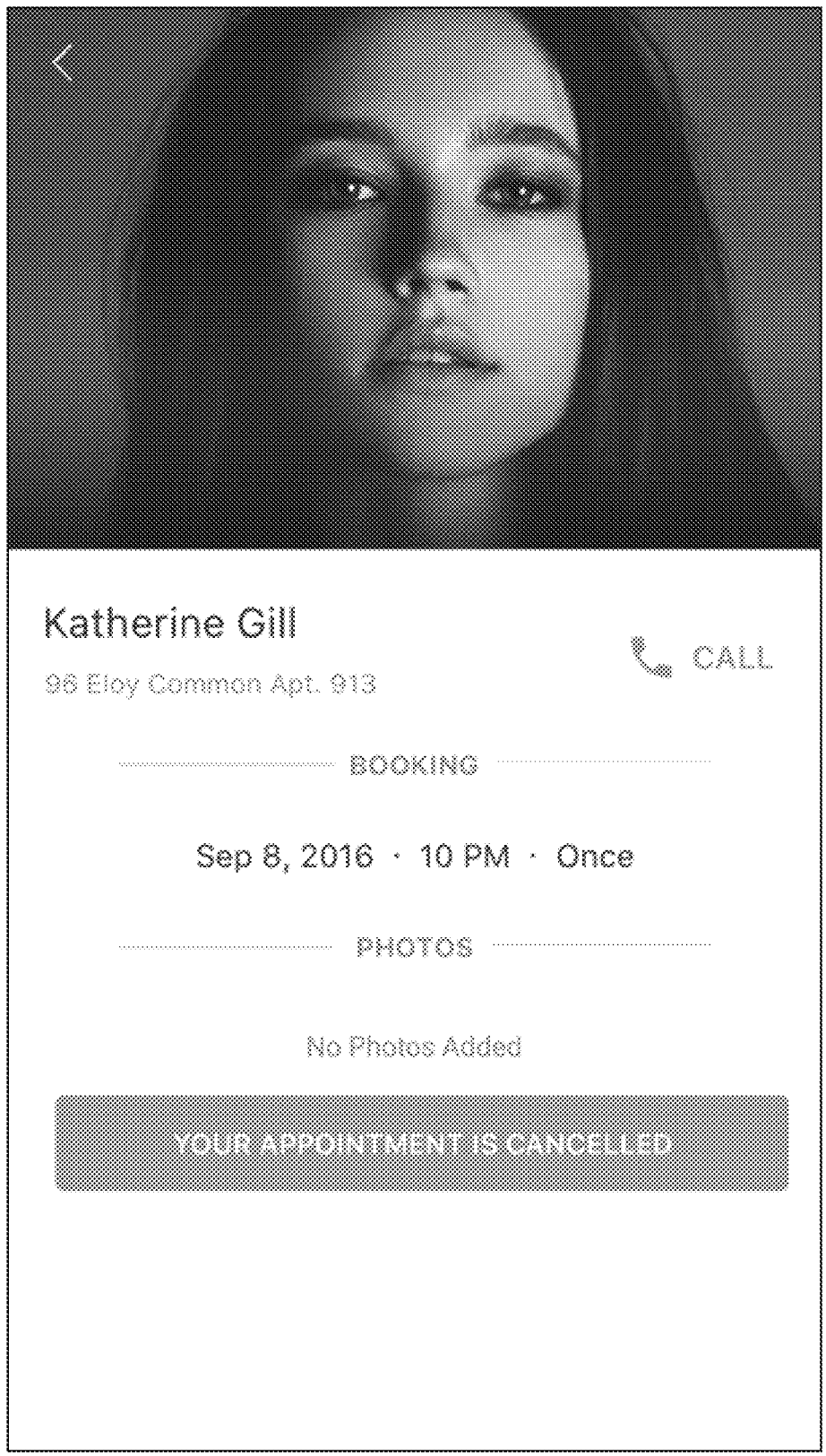
FIG. 20 is a mobile device application screen shot of a cancellation confirmation screen.

Referring now to FIG. 18, there is shown a mobile device application screen shot of a client booking request screen of a client application. This screen provides the details of a client booking request, including identifying information for the client making the request, the location of where the service is to be provided, the date and time of the service, a designation of whether the service is a one-time request or a recurring service opportunity, and additional images as and if pertinent. The kind of service requested and additional details about the service requested may be provided. The screen provides user interface elements to allow the security professional the ability to accept or decline the client request. When the security professional selects the accept user interface element, a booking acceptance screen like that shown in FIG. 19 is provided. The acceptance screen includes pertinent details about the booking as well as user interface elements that allow the security profession to start the booking, typically upon arrival at the specified location, or to cancel the booking. Should the security professional elect to cancel the accepted booking by selecting to cancel from the acceptance screen, the cancellation confirmation screen shown in in FIG. 20 is provided to the security professional showing that the appointment has been cancelled. The cancellation confirmation screen includes pertinent details about the cancelled client request.

Figure 21:
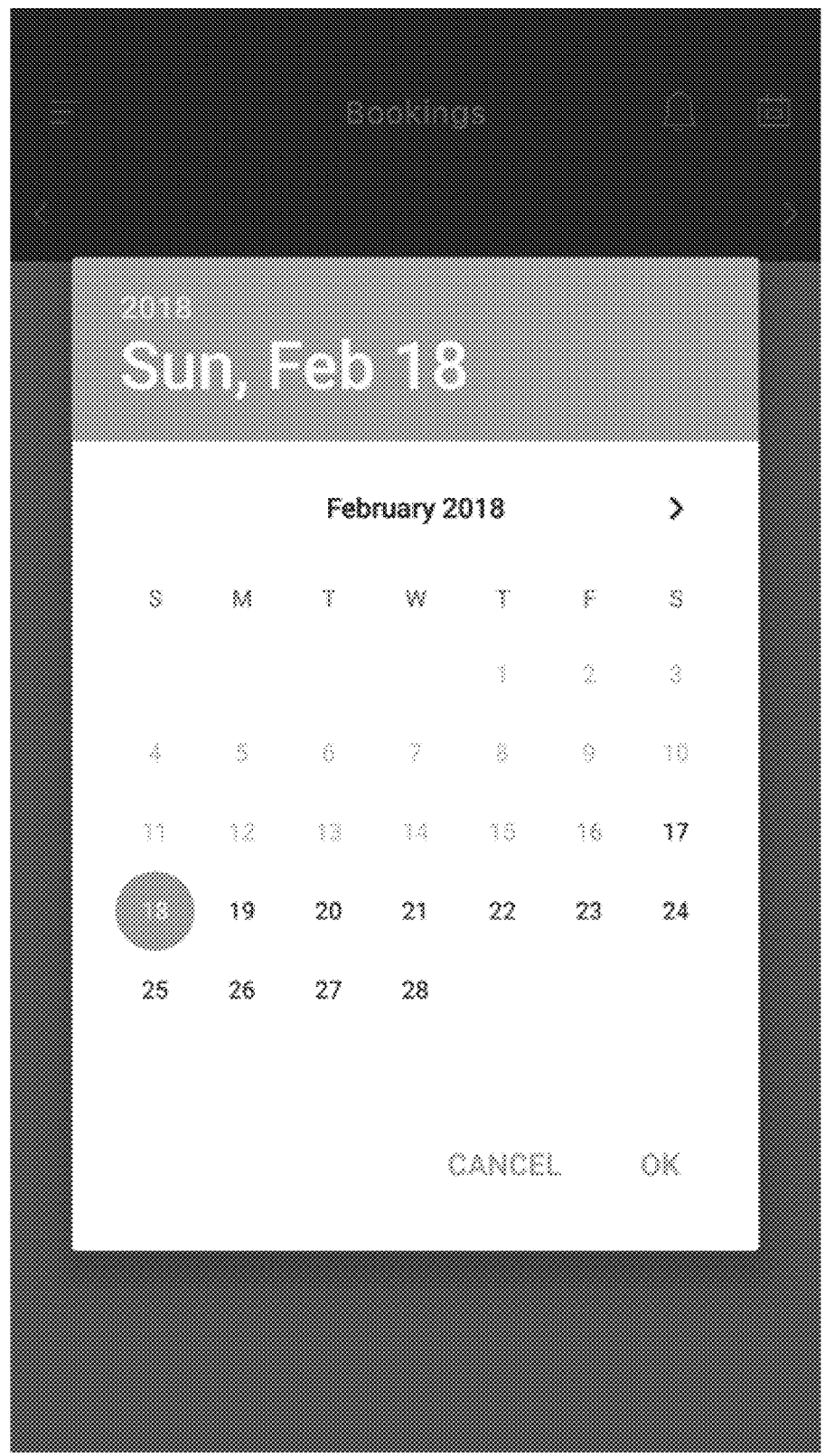
FIG. 21 is a mobile device application screen shot of a calendar screen.

FIG. 21 is a mobile device application screen shot of a calendar screen that allows the security professional view bookings scheduled for certain days in the future. The calendar screen displays a month or week of bookings on a calendar, and may be configurable by the security professional. In one implementation, the security professional may reach the calendar by double-clicking on the horizontal date listing included in the "my bookings" screen shown in in FIG. 10.

Figure 22:
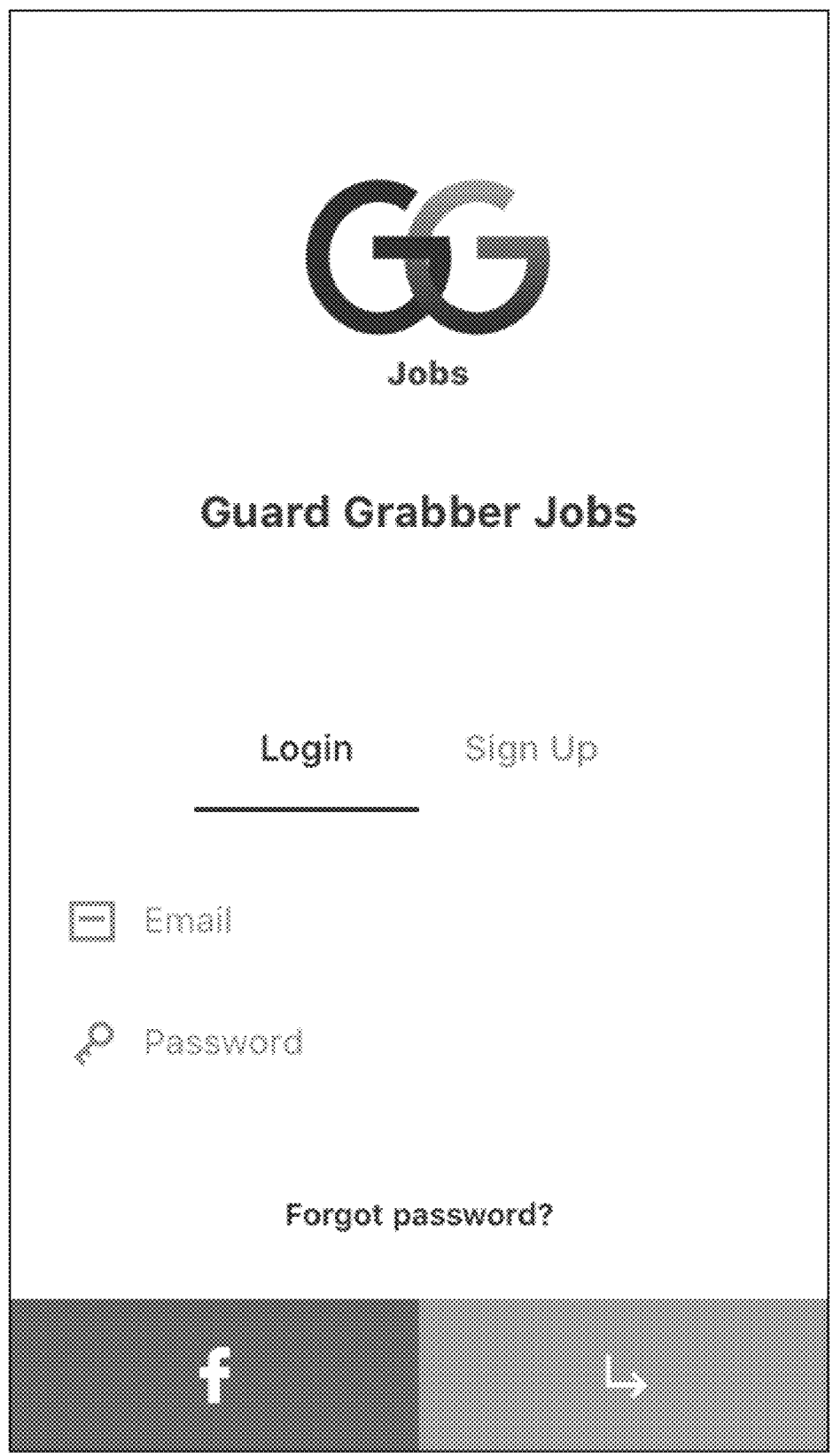
FIG. 22 is a mobile device application screen shot of a security professional login screen.

Referring to FIG. 22, there is shown a mobile device application screen shot of a security professional login screen providing user interface elements to allow the security professional to login or register with text entry boxes allowing for entry of email address and password.

Figure 23:
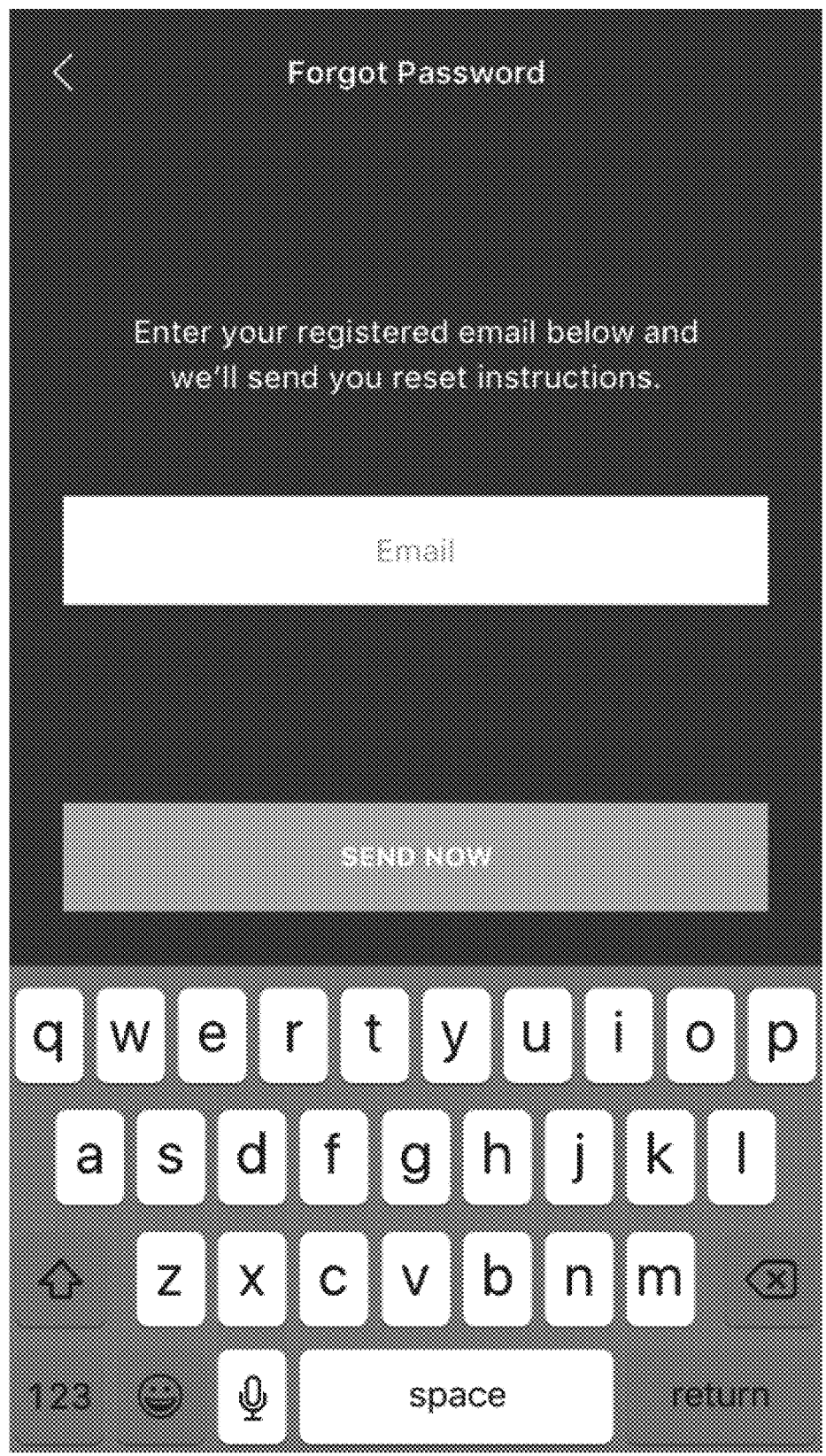
FIG. 23 is a mobile device application screen shot of a password recovery screen.

Referring now to FIG. 23, a mobile device application screen shot of a password recovery screen is shown. This screen provides the ability for clients to recover a lost password by specifying their email address. The send now button enables reset instructions to be forwarded to the client for password retrieval by email, text message or other communication technology.

Figure 24:
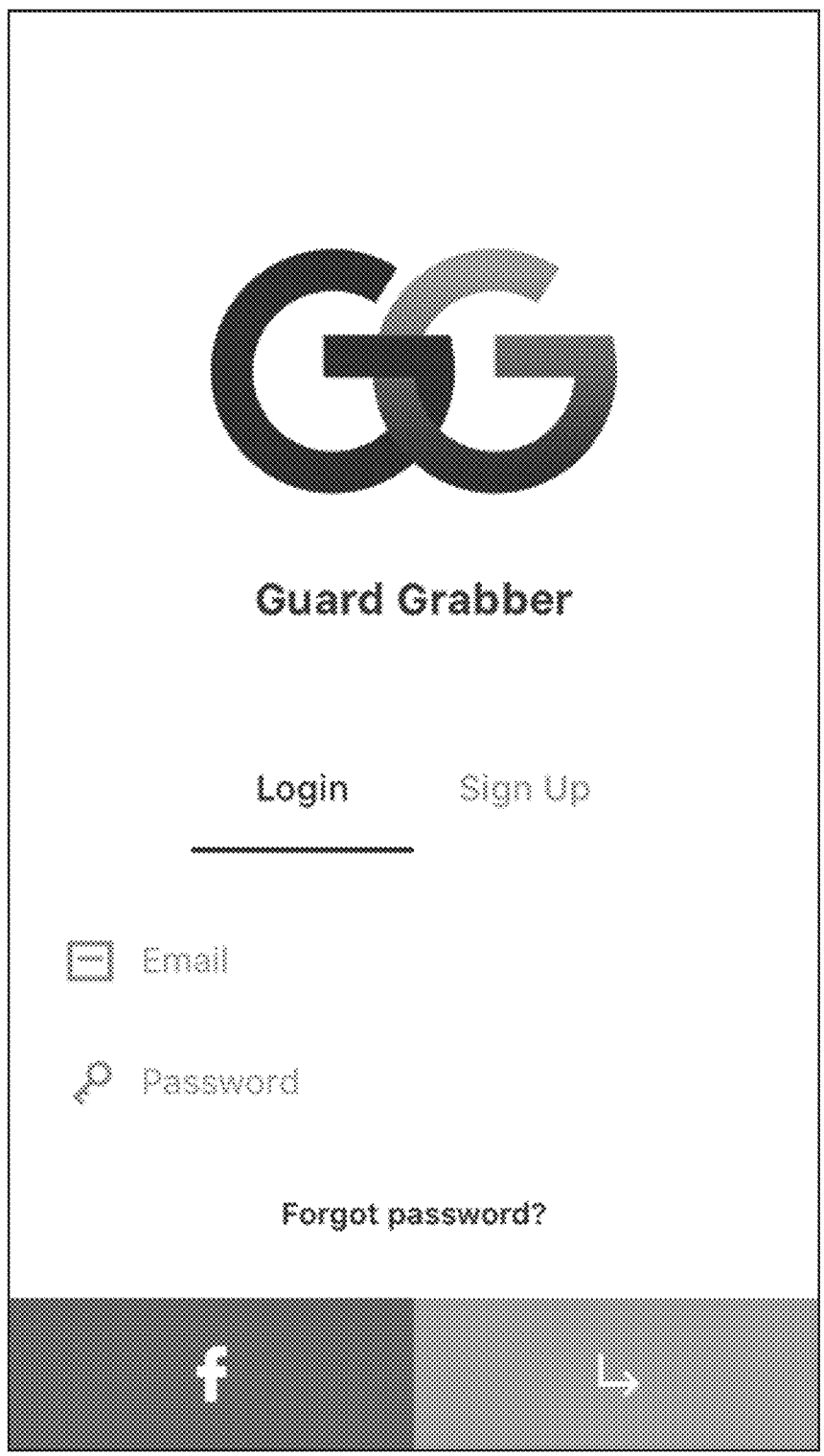
FIG. 24 is a mobile device application screen shot of a login screen for the client.

Referring now to FIG. 24, a mobile device application screen shot of the login screen for a client application is shown. The login screen provides the ability for a client to login or registration, according to text on the screen. The login screen provides text entry fields for client entry of an email address and a password. The login screen may also provide for third party authentication for login using Facebook or other third party service provider.

Figure 25:
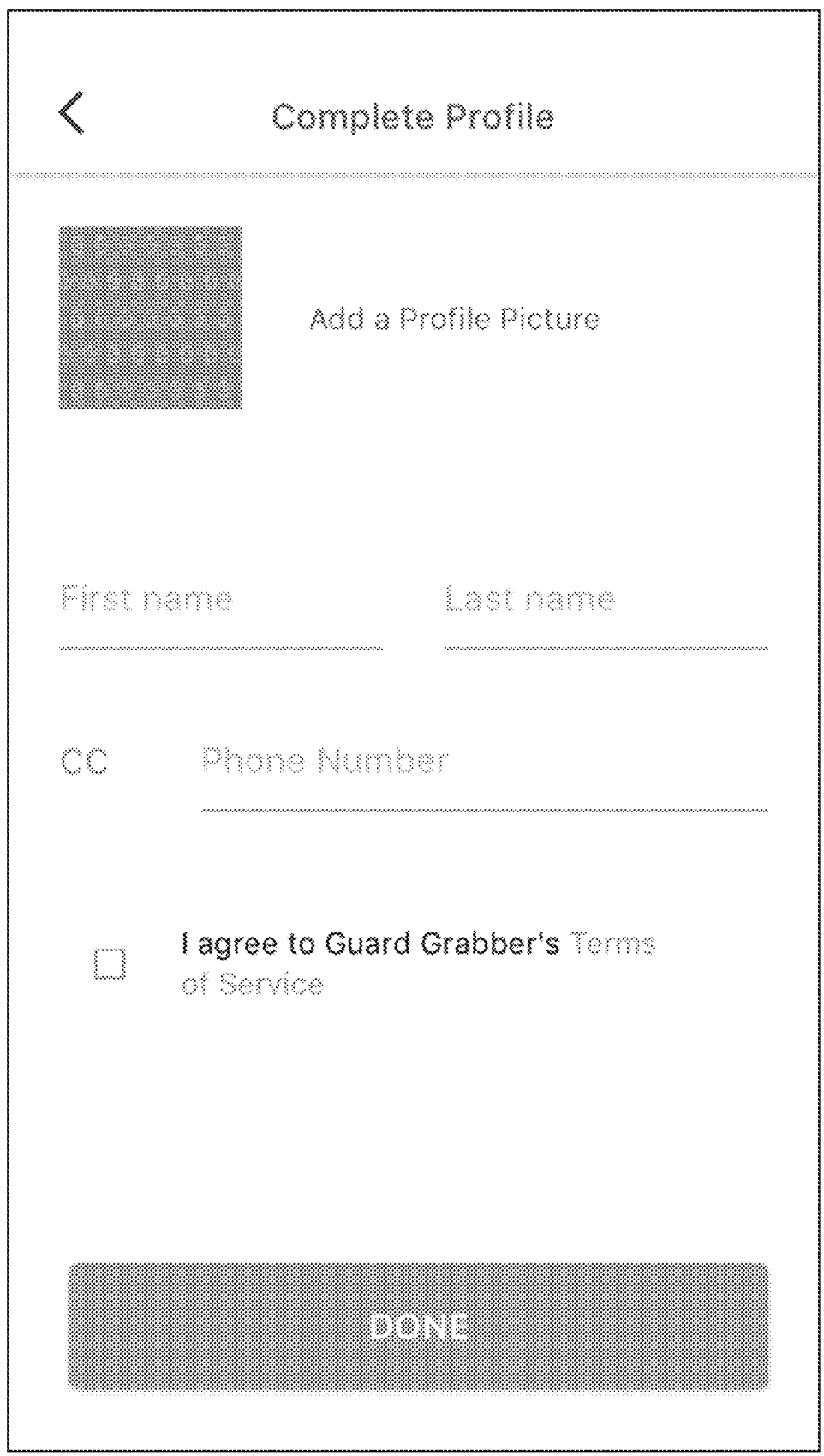
FIG. 25 is a mobile device application screen shot of the client registration screen.

Referring now to FIG. 25, a mobile device application screen shot of a client registration screen is shown. The client registration screen provides clients with the ability complete a client profile by selecting profile picture and entering a client name and client phone number. The client registration screen also provides a radio button, check box or other user interface element for the client to use to accepting the terms of service. After the information is provided on the client registration screen, the client selects the provided done button or other similar user interface element.

Referring now to FIG. 26, there is shown a mobile device application screen shot of security professional tracking screen. The security professional tracking screen of the client application provides the location of security professionals nearby. This is achieved by the security professional applications on the security professionals' mobile devices and reporting the security professionals' locations utilizing the map and GPS system on each of the security professionals' mobile devices to the server application. The security professional's application communicates the security professional's location to the server application. The client's application obtains nearby security professionals' locations from the server application. Each of the security professionals that are near the client are identified on the map by a graphic or icon representing the specialty of the security professional. In this way the client can readily ascertain whether a desired kind of security professional is nearby. In one implementation, the graphic or icon may have paired with it or included in it a score or rating of the security professional. The rating may be a numerical scale such as, for example, from 1 to 5 or 1 to 10, or may be a letter scale similar to school grades, such as, for example, A, B, C, etc.

In one implementation using the client application the client may locate security professionals near a specified location by entering address, town, city and/or zip code into the security professional tracking screen. The client application allows the client the ability to learn more information about nearby security professionals by clicking on or otherwise activating the graphic or icon representing the security professional. In response, the client application displays a profile of the security professionals that includes a button or other user interface item allowing the client to book the security professional instantly alongside or adjacent to the security professional's name, a photo of the security professional, a specialty designation which may be in text and/or a graphic or icon, the hourly rate for the professional, the current, live distance from the client or client specified location, and a rating for the professional. Depending on the implementation, the client application provides the client the ability to book instantly or request services to be provided at a later time. Both options maybe provided via button or linked text on the security professional tracking screen, such a "book now" and "book later" buttons or linked text. As used in this and the prior paragraph, the words near and nearby mean a user customizable system defined distance from the client. The distance may be 1 mile, 5 miles, 8 miles, 10 miles, 12 miles, 15 miles and others. That is, the security professional tracking screen provides graphical representations or icons designating those security professionals that are near or nearby the client or the client specified location.

Figure 27:
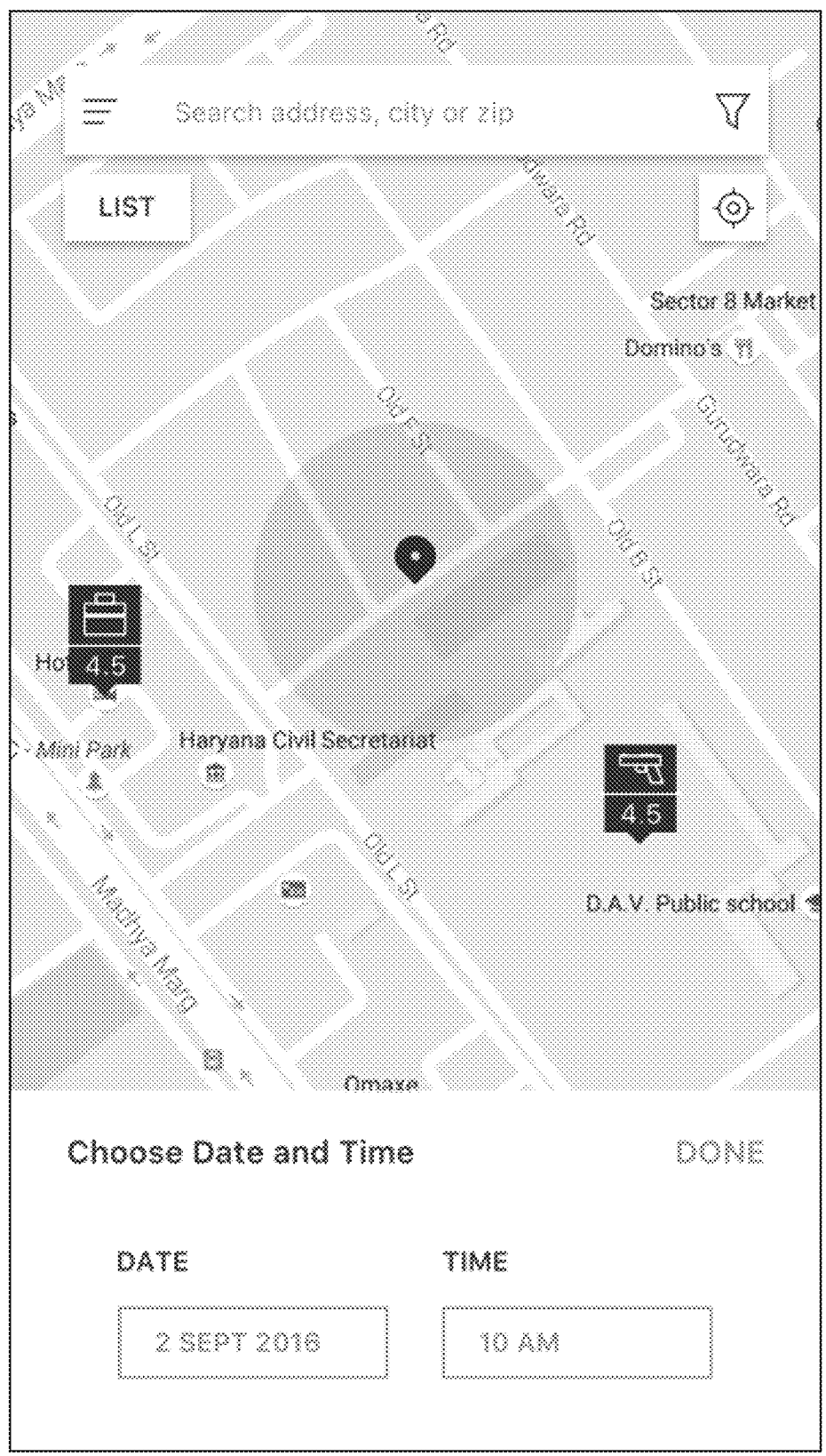
FIG. 27 is a mobile device application screen shot of a security professional tracking booking screen.

When a client selects to book a security profession from the security professional tracking screen shown in FIG. 26, the client application screen shot of a security professional tracking booking screen is provided as shown in FIG. 27. This screen is provided after the client selects the "book,", "book now" or "book later" button or linked text, depending on the implementation. In one implementation, the client selects one of these booking user interface items, user interface items designating date and time are provided along with text entry boxes for the client to enter the date and time for the security professional. In one implementation, the text entry boxes are prepopulated with the current date and next hour from the current time. For example, if the current date and time are Apr. 14, 2017 at 9:21 a.m., the client's application may, in response to the client selecting a book user interface item, provide date and time entry boxes prepopulated with Apr. 14, 2017 and 10:00 a.m. The client may then change the information in the boxes to meet the client's needs.

The security professional tracking screen of FIG. 26 may also include on the map a user interface items such as a button labelled list that provides a screen listing those security professionals that are nearby. An example listing of security professionals is shown in FIG. 28. The listing may include for each security professional, their name, the services they offer, their rating, their distance from the client's service location, their hourly rate, the designation of their specialty, and, if pertinent and depending on the implementation, a photograph of the security professional and the professional's height and weight and any special skills or training. The listing screen also provides user interface element giving the client the option to select a security professional and then book now or book later the selected professional. The listing maybe organized as a column of graphically designated cards of security professionals, each card including the pertinent information for the security professional, as shown in FIG. 28.

The listing of security professionals in FIG. 28 may include the ability to filter and/or arrange the listed security professionals. In one implementation an arranging and/or filtering graphic or icon maybe provided on the listing of security professionals in FIG. 28. Such a filter graphic or icon is provided in the screen shot shown in FIG. 28.

Referring now to FIG. 29, a mobile device application screen shot of a security professional listing filter screen is shown. The filter screen is provided after selecting the filter icon in FIG. 28. The filter screen in the client's application provides the client with the ability to select to list only the type of services or specialties a client desires from a list of available services. The available services include, for example, but not limited to, legal process server, security guard, body guard, private investigator and security officer. The services may be listed with an associated graphic or icon. The client's application may provide radio buttons, check boxes, or other graphical user interface to allow the user to select the services desired.

The filter screen also provides the client the ability to arrange the listing of security professionals based on one or more of hourly rate or price and distance from the client or specified location. Other criteria may also be listed and used to arrange the listing, such as maximum availability duration, latest end time, and others. FIG. 30 is a mobile device application screen shot of a security professional listing arrangement screen.

Figure 31:
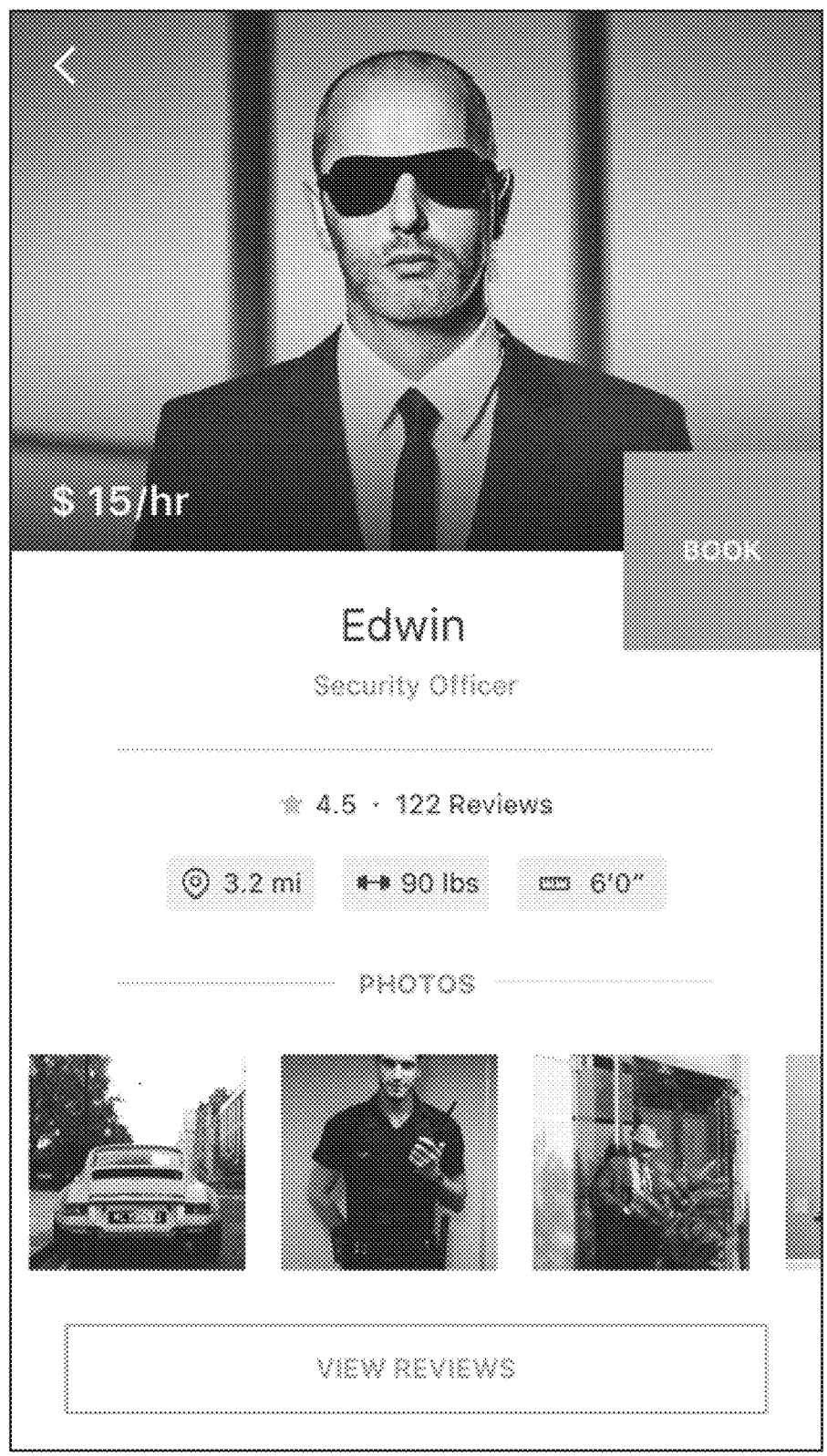
FIG. 31 is a mobile device application screen shot of a security professional profile.

FIG. 31 is a mobile device application screen shot of a security professional profile. In one implementation activating a more information button or double clicking on a listed security professional's name or photo in the security professional listing shown in FIG. 28 and/or an icon in the security professionals tracking screen shown in FIG. 26 causes the client's application to provide a single screen of all information about the professional, which may include more information than included in the listing. The security professional profile screen may include a photo or photos of the security professional and may include photos of pertinent vehicles, facilities or equipment, the security professional's name, the services offered by the security professional, rating, reviews or a link to reviews, height, weight, distance from the client or specified service location, and may include optional items such as a short biography, a list of references, a list of prior clients, a list of prior employers, or links to list the optional items, and others. The profile may provide the client ability to book the security professional by activating one or more provided user interface items.

Figure 32:
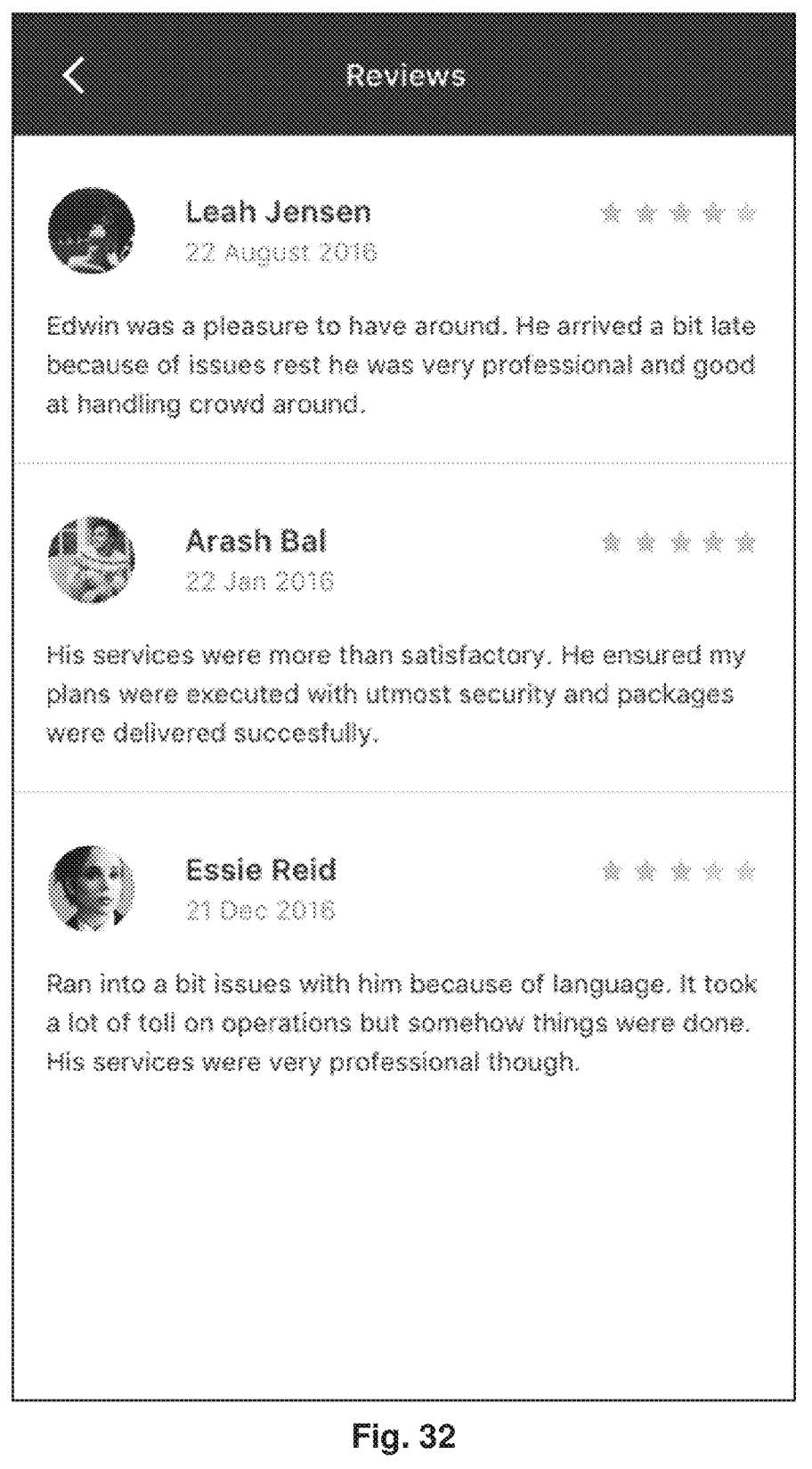

When the client selects the reviews link on a security professional profile like that shown in FIG. 31, the screen shown in FIG. 32 is provided. FIG. 32 a mobile device application screen shot of security professional review listing. The client reviews are composed and provided by clients who have used the particular professional's services through the system. The client reviews are a statement of the client reviewers' experiences with the service provided. Each review may contain the name or alias of the reviewer, the date of the review, a rating and a text description of the reason for the rating. In one embodiment, the reviews are limited to those clients who booked the security professional through the client application and system described herein.

Referring now to FIG. 33, there is shown a mobile device application screen shot of a booking screen. After the client selects to book a security professional in any of the above referenced screens that include a booking user interface item, including the screen shown in FIG. 27, the client either confirms or inputs the desired location of where the service is to be provided and the date and time of the service. The screen may also provide a user interface item such as a radio button or check box to provide the client the ability to select a recurring booking. The screen may provide the client the ability to add images and details of the service requested. The images may be uploaded or imported into the client application from the mobile device or from locations on the Internet or a cloud-based storage service. The images may be helpful to the security professional and may show the client, the client's place of business, the client's home, the client's vehicle, the subject of service, the place of business of a subject of service, or other property or person associated with the service to be provided. The screen includes a user interface item to allow the client to proceed to pay for the booking.

When the client selects to pay for the booking via the user interface shown in FIG. 33, if this is a first use of the client application to book a security professional, the client application prompts the user to enter credit card information by providing a screen allowing the client to specify credit card information, such as the screen shot shown in FIG. 34. This screen includes the typical entry fields for credit card information, such as card number, name on the card, expiration date and additional code number. The client's application may also request other information pertinent to the credit card such as a billing address.

If when the client selects to pay for the booking via the user interface shown in FIG. 33, and the client has earlier entered a payment method, the client's application provides the client with a screen showing available, existing payment options. The screen shot shown in FIG. 35 is an example screen shot of a client's application payment method selection screen. The payment method selection screen lists earlier entered payment methods, providing a list of identifiers of credit cards earlier entered into the client application by the client. The credit cards may be listed by name or identifiers provided by the client and/or by the type of card and a portion of the digits of the cars, typically the last four digits. Plus, an accompany logo or graphic may be provided for each payment method.

Figure 36:
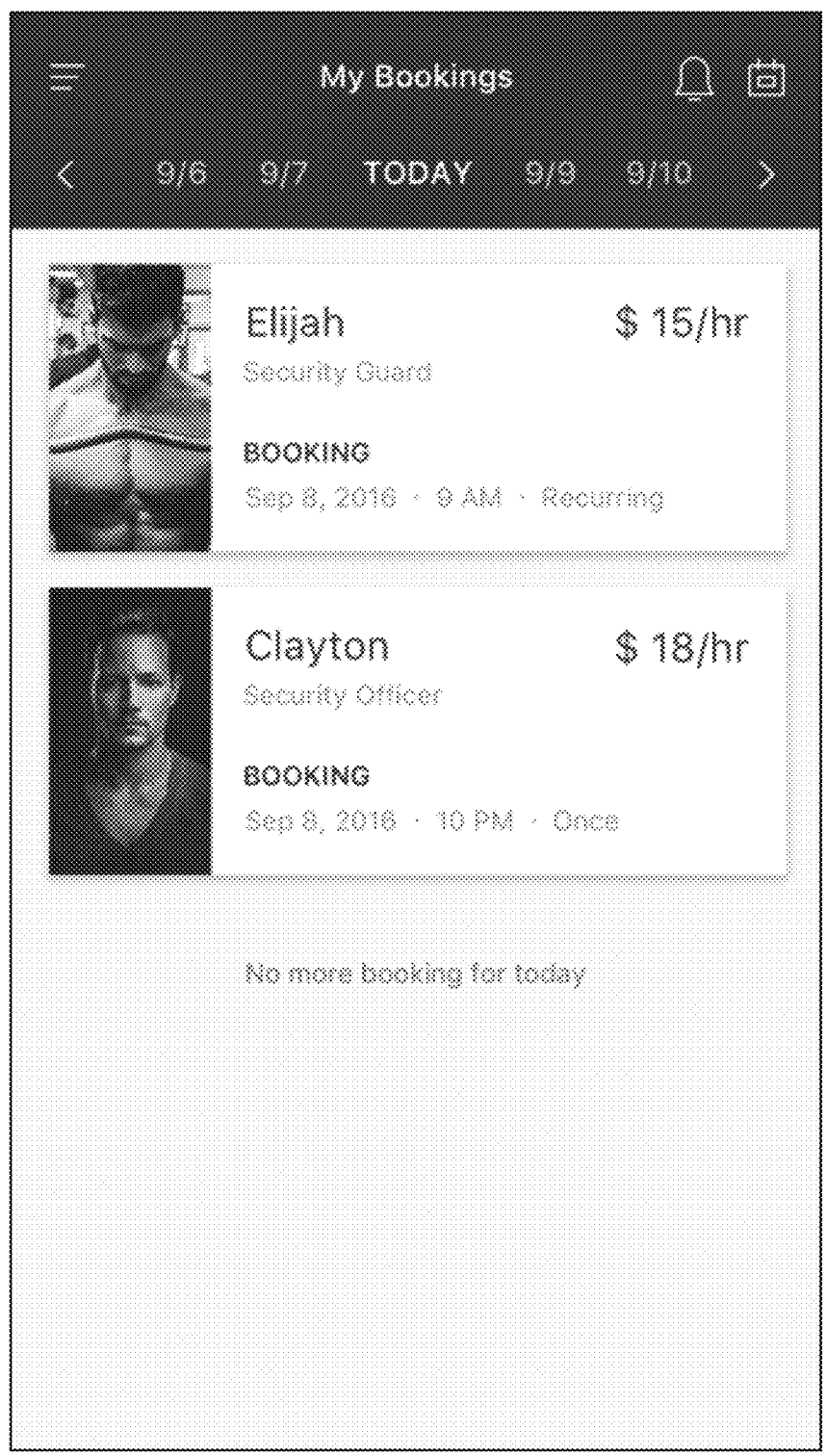
FIG. 36 is a mobile device application screen shot of a client's "My Bookings" screen.

Referring now to FIG. 36, there is shown a mobile device application screen shot of a client's "My Bookings" screen. When selected to be displayed by the client, the client application provides a "My Bookings" screen showing the bookings that placed by the client, which may include, depending on the implementation or client election, pending, current and/or past booking. The booking screen may provide graphical business cards of the security professional booked including the name of the security professional, their hourly rate, the time and date of the booked service, and an indication of whether the booking is recurring or just once. The location of where the booked service is to be or was provided may also be included in the listing. The bookings screen may provide a horizontal date bar toward the top to allow the client to select listing of bookings on adjacent dates. This bookings screen may be selected in the client application by client from the client application's main menu shown in FIG. 38.

Figure 37:
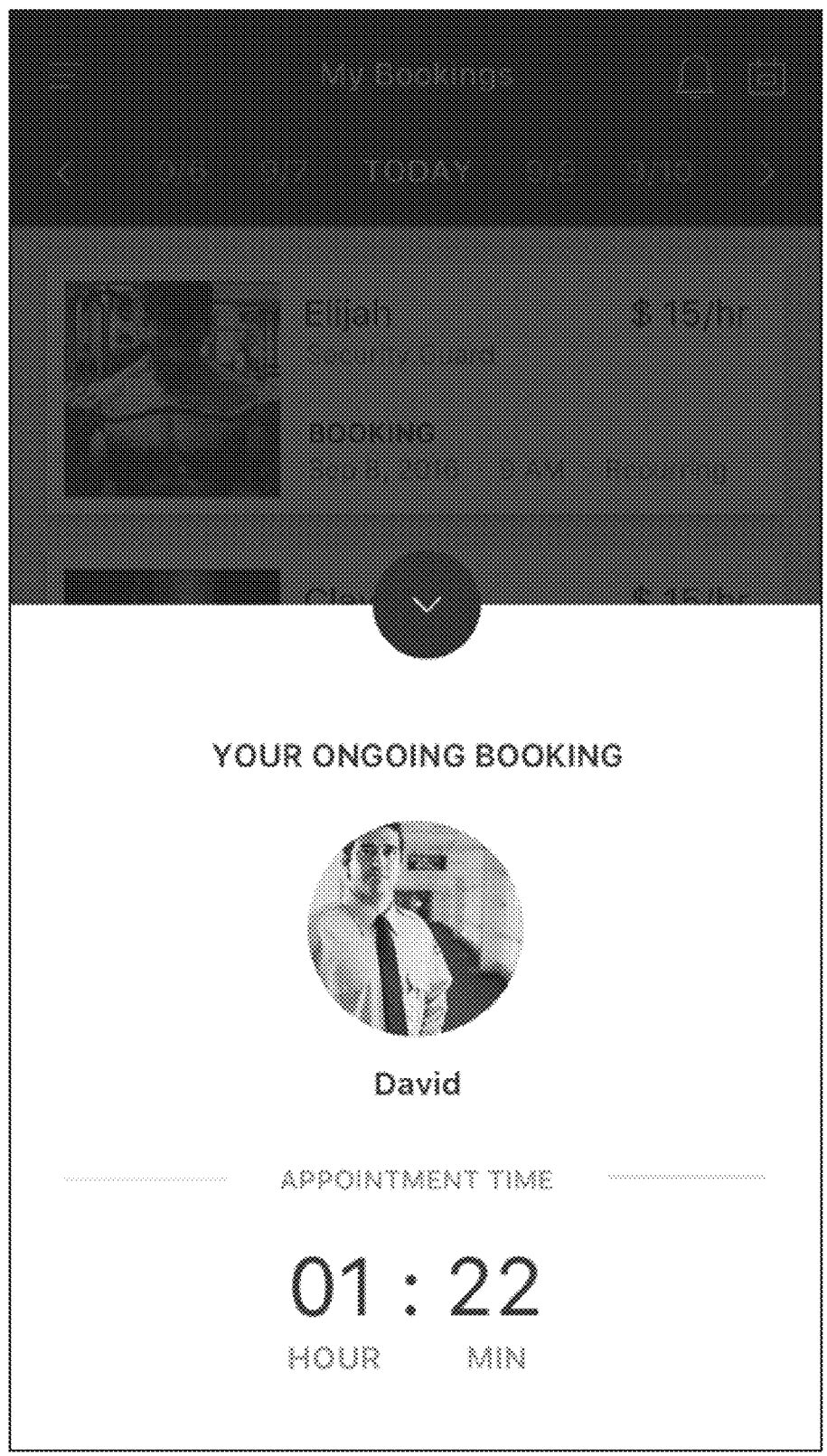
FIG. 37 is a mobile device application screen shot of an ongoing booking screen.

Referring now to FIG. 37, there is shown a mobile device application screen shot of an ongoing booking screen. This screen shows a currently active or ongoing booking between a client and security professional. The screen includes a photo of the security professional, the name of the security professional, and the current elapsed time since the booking started showing the expended number of hours and minutes of the current booking. In another implementation, the screen may also include a start time of day for the booking and/or an end time of day for the booking. This screen may be reached by a client by the client clicking on or otherwise activating the current booking from the bookings list shown in FIG. 36 and may be available from a start screen or home screen provided by the client application to the client.

Figure 38:
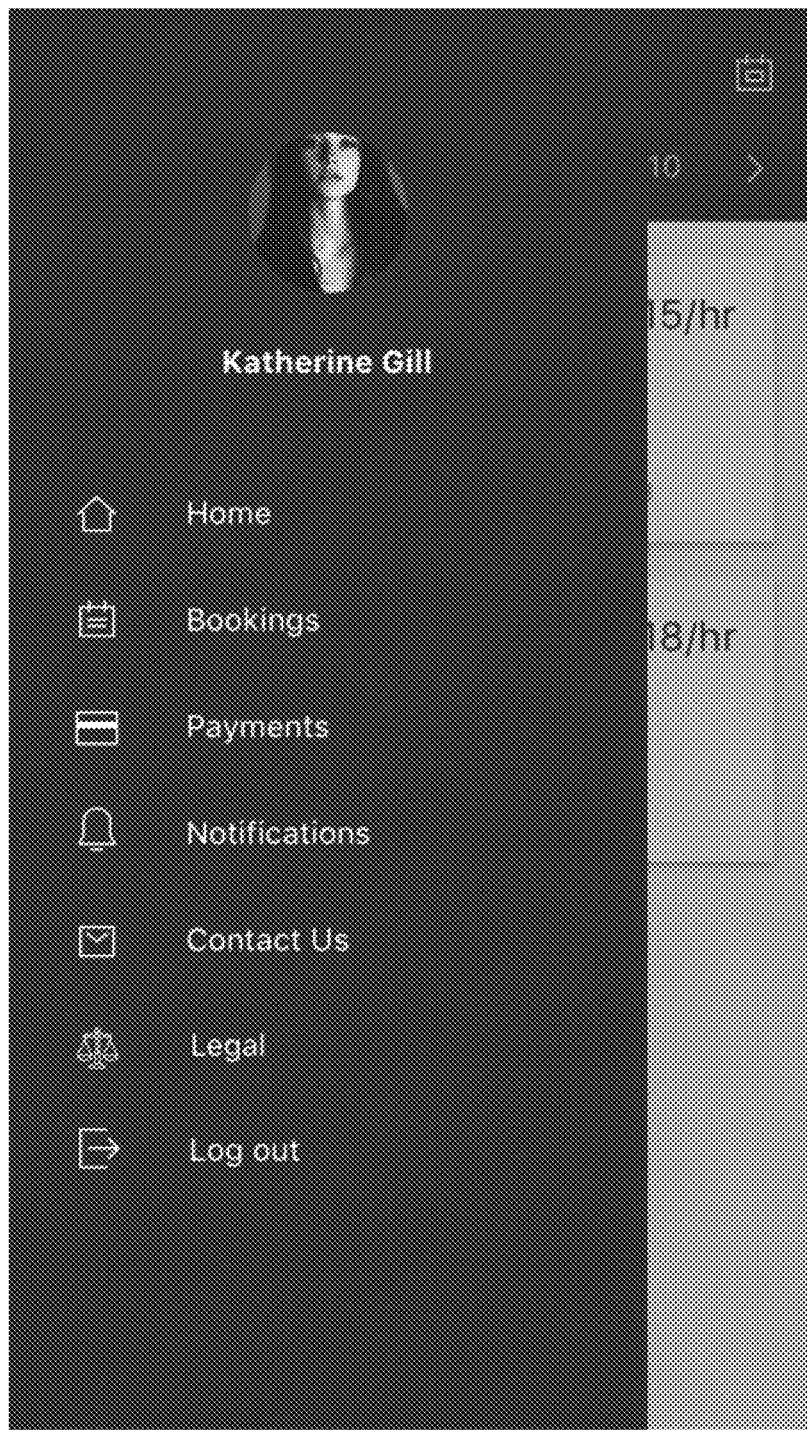
FIG. 38 is a mobile device application screen shot of a client main menu.

FIG. 38 is a mobile device application screen shot of a client main menu. The main menu may include the client's name, the client's photo and provide the client the ability to select to transition to a home screen, a bookings screen (FIG. 36), a payments screen (FIG. 35), a notifications screen, contact support, view legal information, and logout. The options on the main menu may be text links which may be accompanied by an associated graphic or icon. The client main menu may be activated or displayed by a client Referring now to FIG. 39, there is shown a mobile device application screen shot of a completed appointment screen. After a service has been provided, the security professional clicks or otherwise activates an appropriate button or other user interface item on the security professional's application to signify cessation of the service, which causes the completed appointment screen to be displayed on the client's application. The completed appointment screen includes the name and photo of the security professional who provided a service, the amount of time (total duration) in hours and minutes the security professional spent in providing the service, the number of billable hours which is a rounding up of the total duration hours to the next hour, the security professional's hourly rate, a subtotal based on the security professional's billing rate and the number of billable hours, a booking fee (as described above regarding FIG. 17), and a total which is the sum of the booking fee and the subtotal. Included in the hourly rate is a commission paid to the system provider. The commission may be 25% of each billable hour and is paid directly by the client to the company offering the applications and system. Other percentages or flat rate commissions may be built into the system and applications by the system provider. The commission may be, for example, 15%, 18%, 20%, 23%, $2 per hour, $10$ per hour, $20 per hour and others. When this screen appears, the security billing hourly rate is the security professional hourly rate plus a commission. Only the combined security professional hourly rate and the commission is shown as the billing rate to the client on this screen. This screen confirms the amount charged to the payment method selected or designated during the booking process. In one embodiment, when the security professional clicks or otherwise activates an appropriate button or other user interface item on the security professional's application to signify completion of the service booking, the system initiates payment from the client to the system provider and from the system provider to the service professional. In embodiments, the timing and sequence of the payments may differ. The screen may also provide a graphical user interface element directing the client to rate the services provided and the security professional.

Figure 40:
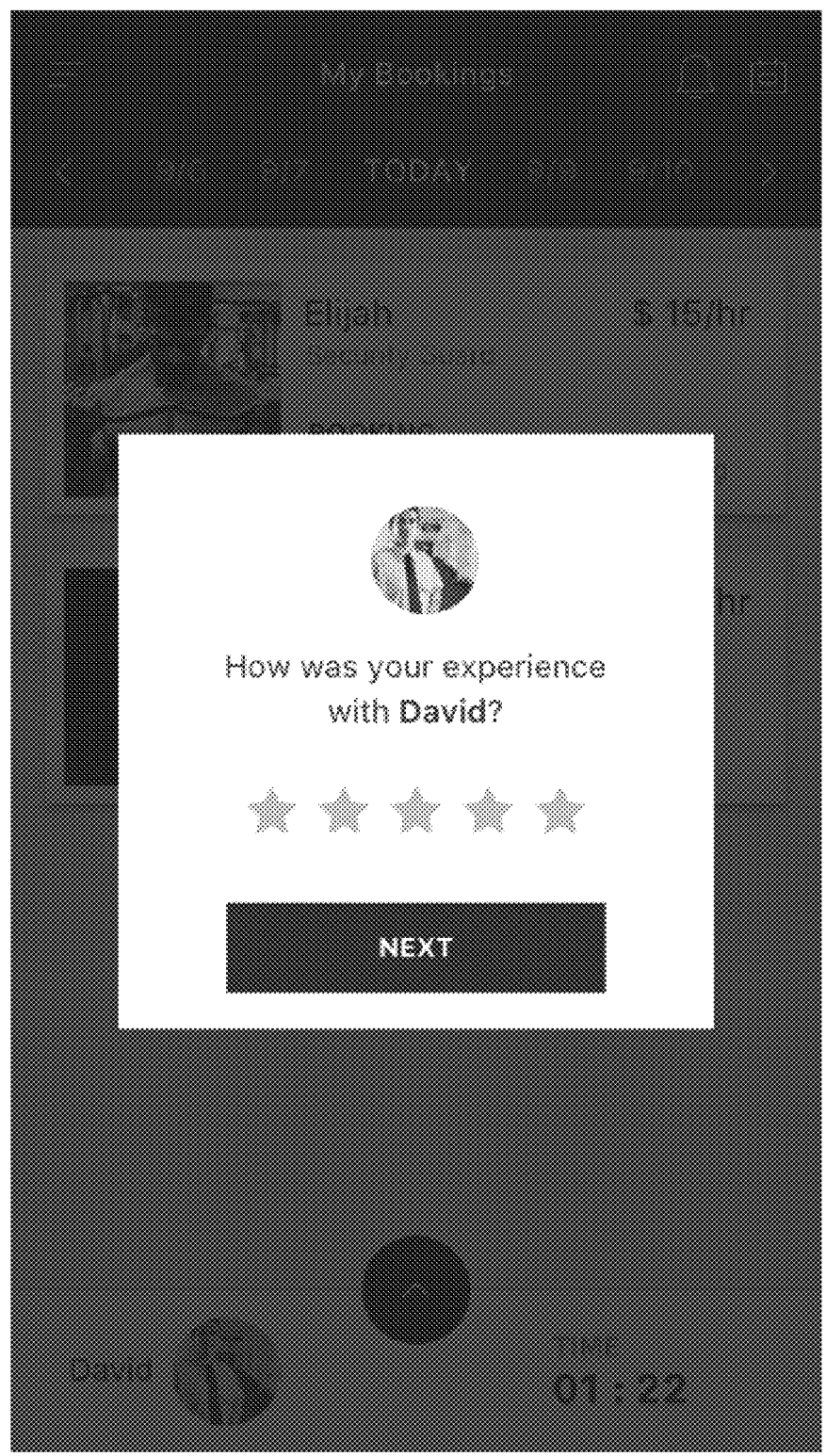
FIG. 40 is a mobile device application screen shot of a rating screen.
Figure 41:
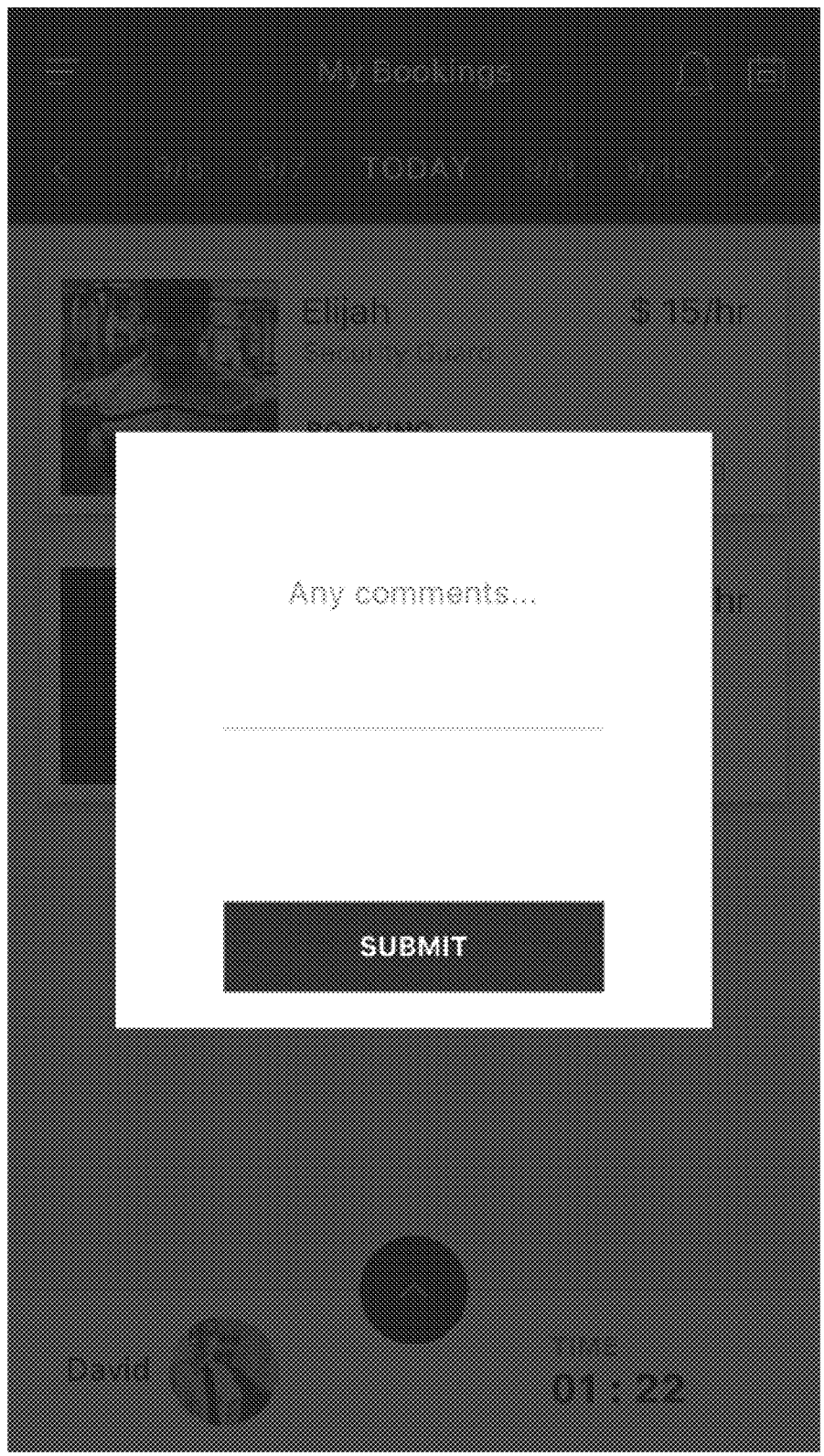
FIG. 41 is a mobile device application screen shot of a review screen.

When the client selects the graphical user interface to rate the services provided in FIG. 39, a mobile device application screen shot of a rating screen is provided as shown in FIG. 40. The rating screen begins a review and raring process by giving clients the ability to rate the experience they had and the level of the service they received. In the example shown, a one to five-star system is used. Other ratings schemes and related graphics may be used. After a rating is received by the client application from the client, the client is prompted by a "next" button or other user interface item to go to a next screen to enter a text review, as shown by FIG. 41. The review screen provides a text field or box into which the client may enter comments or a review on the service provided and the security professional.

Figure 42:
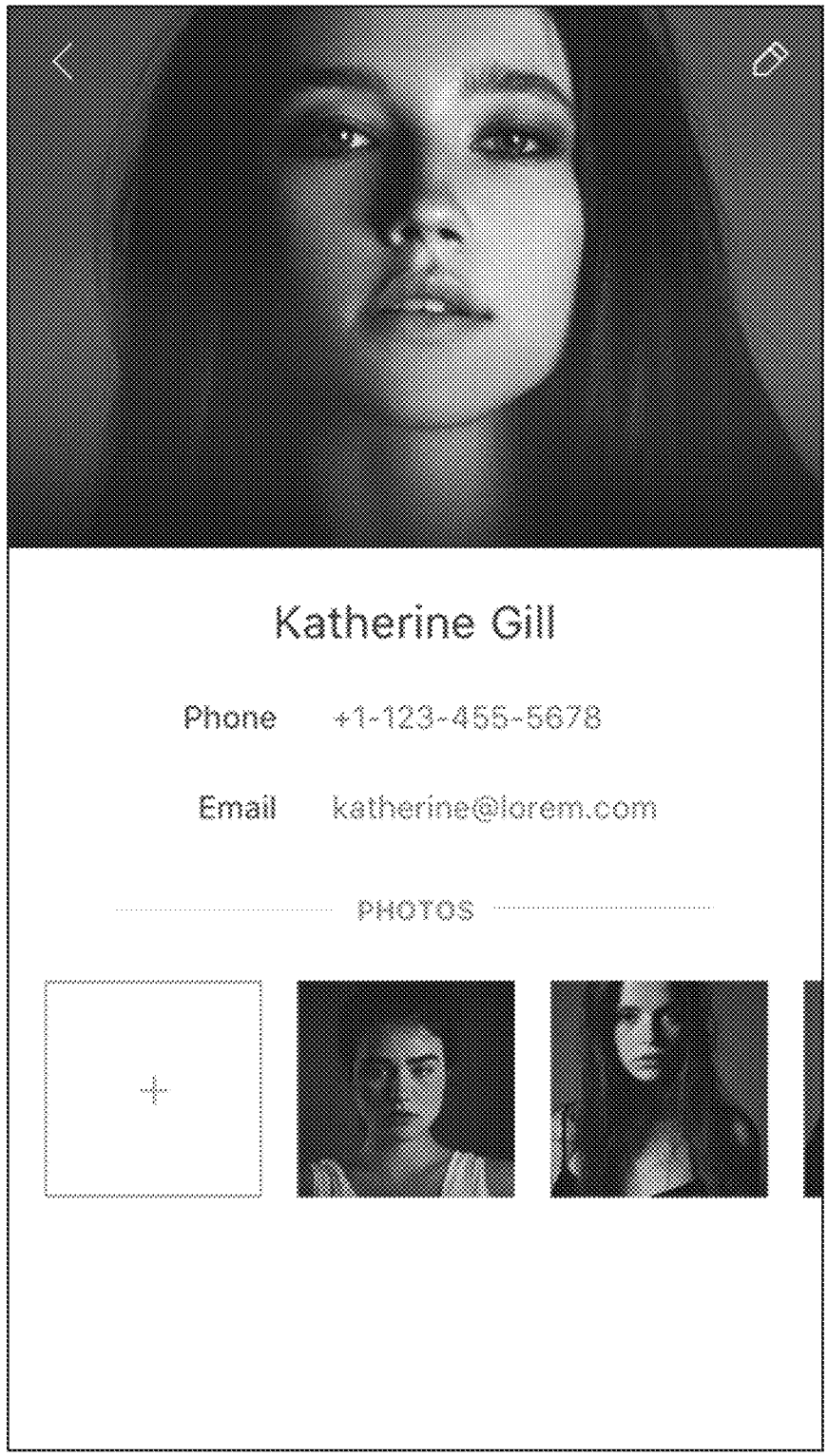
FIG. 42 is a mobile device application screen shot of a client profile screen.

FIG. 42 is a mobile device application screen shot of a client profile screen. The client profile screen includes one or more photos of the client, the client's name, phone number, and email address. In some implementations, one or more addresses for the client may be included. This screen may be provided to the client or a security professional with which the client has placed a booking. In one implementation, a security professional may only view the client profile after the particular client has booked the security professional.

Figure 43:
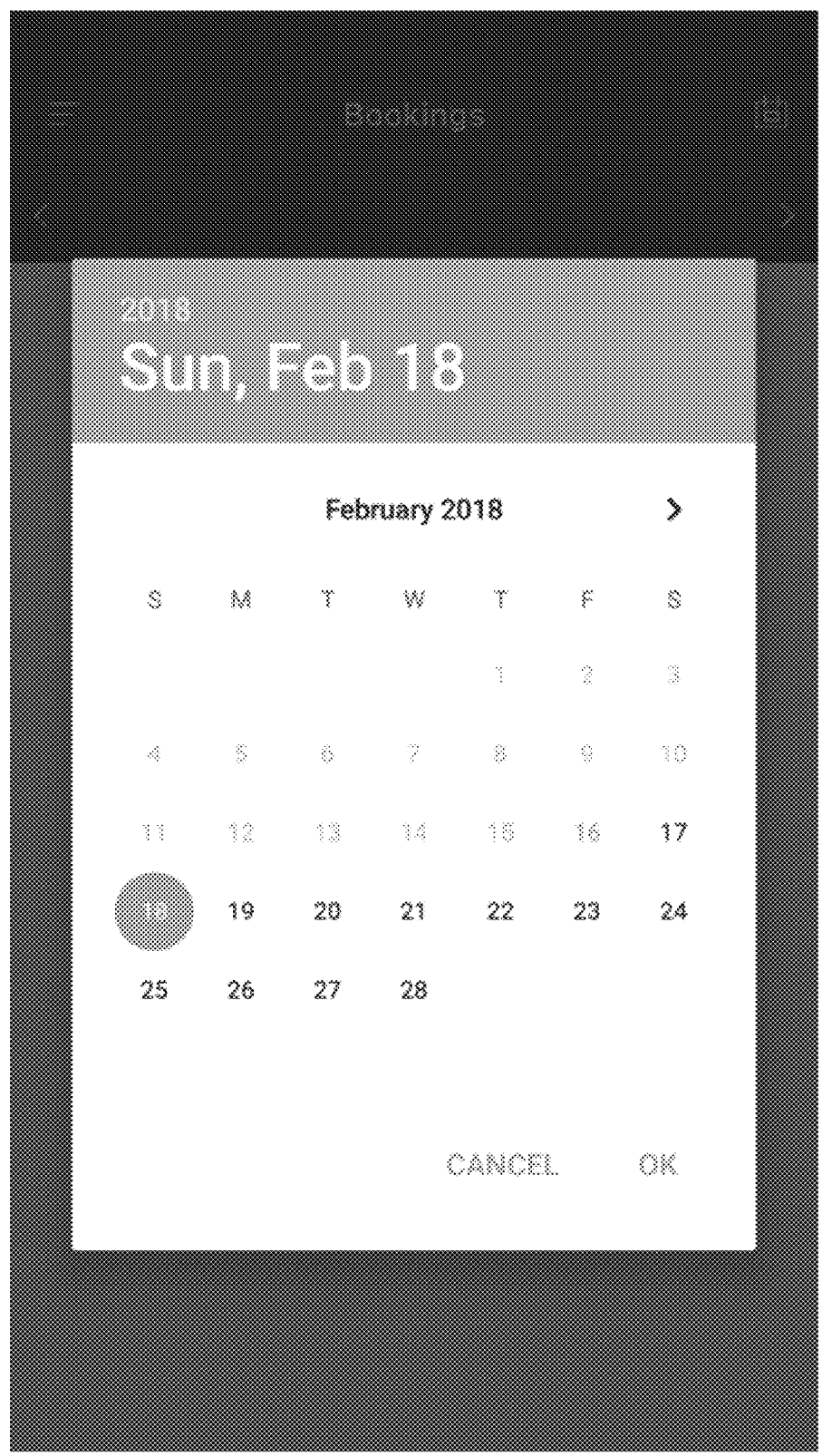
FIG. 43 is a mobile device application screen shot of a booking calendar screen.

Referring ow to FIG. 43, a mobile device application screen shot of a booking calendar screen is shown. The booking calendar allows clients and security professionals to view their scheduled bookings on a full month calendar. The days on which there are bookings may be designated by a particular color or shading. In one embodiment, past bookings may be designated by one color future bookings another color, and current or impending bookings yet another color. Shapes may alternatively or concurrently be used to designate the past, present or future feature of the bookings. In other embodiments, weekly calendars may also be provided by the applications.

Figure 44:
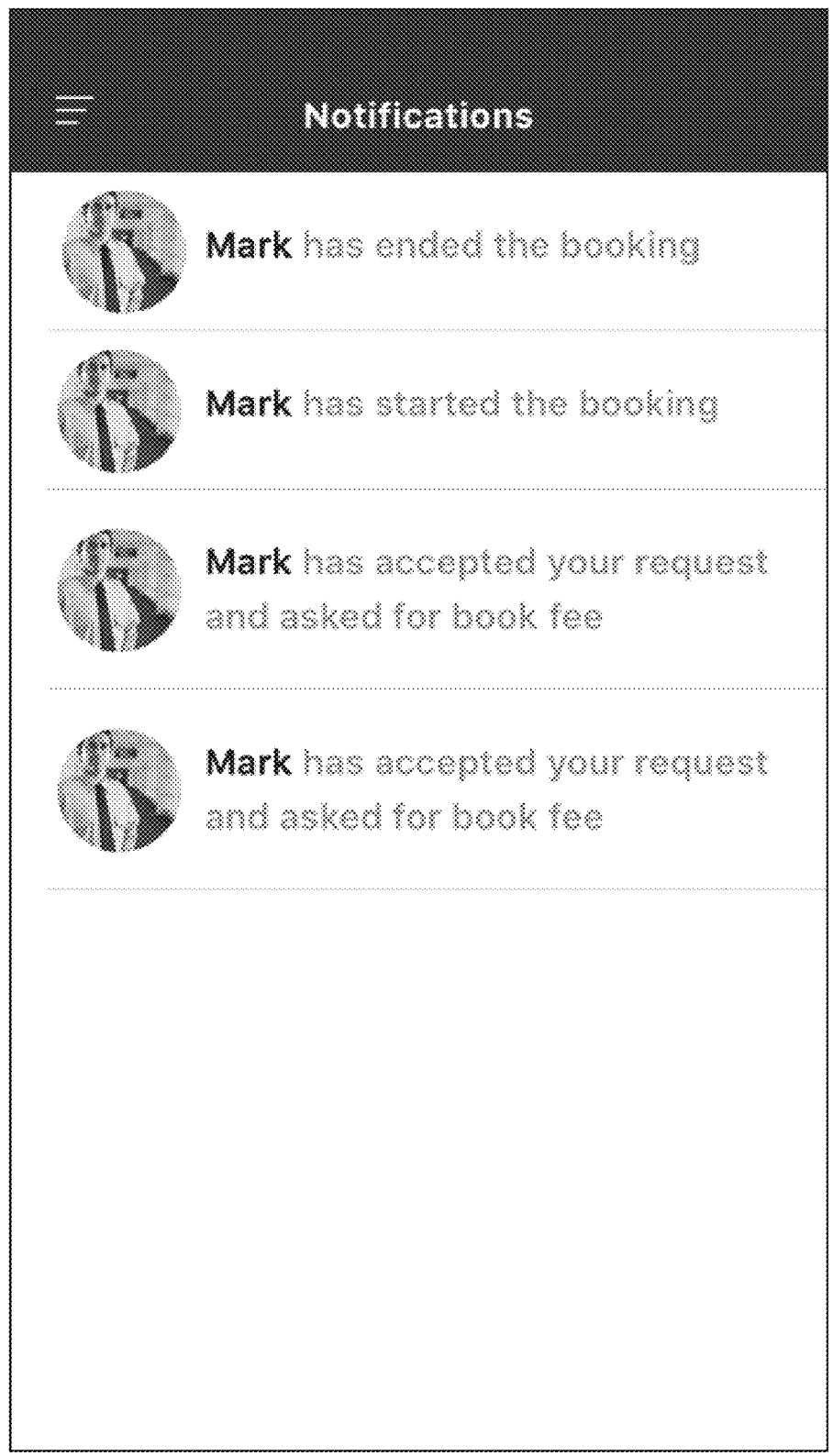
FIG. 44 is a mobile device application screen shot of a notifications screen.

FIG. 44 is a mobile device application screen shot of the notifications screen for the client application showing the activity log and whether the security professional preformed or canceled in regard to the client's request.

It is claimed:

1. A method of booking security professionals comprising:
    a server application executing on a server computer receiving via security professional application programs operating on mobile computing devices a plurality of registration requests from a plurality of security professionals, the registration requests including a security professional name, a specialty designation, a security professional social security number, a security professional driver's license number, a security professional address, and a professional license number;
    for each security professional, the server application evaluating the registration request and either accepting the registration request or rejecting the registration request;
    the server application communicating a result of the evaluating to the security professional application program causing the security professional application program to:
        when rejecting the registration request, display a registration denied screen to the security professional,
        when accepting the registration request, display a registration accepted screen and prompt the security professional to specify additional registration information including an hourly rate and at least one selected from the group including preferred geography, preferred hours, special equipment, special skills;
    the server application receiving via client application program operating on mobile computing devices a plurality of client profiles from a plurality of clients, the client profiles including a client name and a client mobile device phone number;
    the server application receiving from a plurality of security professional application programs current locations of a plurality of security professionals;

the client application program providing a map showing a current location of a first client with a first icon and nearby security professionals of the plurality of security professionals, each of the nearby security professionals represented by a security professional icon selected from a plurality of security professional icons, the client application program receiving from the server application at least one location of the nearby security professionals, wherein a nearby security professional is within a system defined or first client specified distance from the first client;

the server application receiving from the first client via the client application program a booking request to book a first of the nearby security professionals including a booking time, a booking date, a booking duration and a booking location;

the server application notifying a first nearby security professional about the booking request via the security professional application program running on the mobile device of the first nearby security professional;

the client application program showing on the map the location of the first nearby security professional as the first nearby security professional moves toward the location from the client request, including updating the location of the first nearby security professional on the map in the client application program, the updating comprising:

the server application receiving location information about the first nearby security professional from the security professional application program running on a mobile computing device of the first nearby security professional, the client application program obtaining the location of the first nearby security professional from the server application;

the server application receiving a start appointment notification form the first nearby security professional via the security professional application program running on a mobile computing device of the first nearby security professional;

the server application receiving a completed appointment notification form the first nearby security professional via the security professional application program running on the mobile computing device of the first nearby security professional;

the server application processing a first payment from the first client, the payment including a service fee and a commission, wherein the commission is separate from the service fee and is calculated based on a system defined percentage of a first hour rate for the first nearby security professional;

the server application initiating a second payment to the first nearby security professional in the amount of the service fee;

the server application retaining the commission.

2. The method of booking security professionals of claim 1 wherein the specialty designation includes one or more of a body guard, private investigator, process server, security officer, or security guard.

3. A computerized system for facilitating on-demand security services comprising:

a server computer comprising a processor and a non-transitory machine readable medium;

a plurality of mobile devices associated with a plurality of security professionals, wherein the plurality of mobile devices are configured to communicate with the server computer over a network;

a server application stored on the non-transitory machine readable medium which, upon execution by the processor of the server computer, configures the server computer to perform the steps of:

receiving from security professional application programs operating on mobile computing devices a plurality of registration requests from a plurality of security professionals, the registration requests including a security professional name, a specialty designation, a security professional social security number, a security professional driver's license number, a security professional address, and a professional license number;

for each security professional, evaluating the registration request and either accepting the registration request or rejecting the registration request;

communicating a result of the evaluating to the security professional application program causing the security professional application program to:

when rejecting the registration request, display a registration denied screen to the security professional, when accepting the registration request, display a registration accepted screen and prompt the security professional to specify additional registration information including an hourly rate and at least one selected from the group including preferred geography, preferred hours, special equipment, special skills;

receiving from a plurality of security professional application programs current locations of a plurality of security professionals;

receiving from client application programs operating on mobile computing devices a plurality of client profiles from a plurality of clients, the client profiles including a client name and a client mobile device phone number;

receiving from the client application program a current location of a first client;

identifying those of the security professionals that are nearby the first client, wherein nearby is within a system defined or first client specified distance from the first client;

communicating the security professionals that are nearby the first client to the client application of the first client, causing the client application program to provide a map showing the current location of the first client with a first icon and the nearby security professionals each represented by a security professional icon selected from a plurality of security professional icons;

receiving from the first client via the client application program a booking request to book a first of the nearby security professionals including a booking time, a booking date, a booking duration and a booking location;

notifying a first nearby security professional about the booking request via the security professional application program running on a mobile device of the first nearby security professional;

receiving location information about the first nearby security professional from the security professional application program running on the mobile computing device of the first nearby security professional and sending the location of the first nearby security professional to the client application program of the first client;

receiving a start appointment notification from the first nearby security professional via the security professional application program running on the mobile computing device of the first nearby security professional;

receiving a completed appointment notification from the first nearby security professional via the security professional application program running on the mobile computing device of the first nearby security professional;

processing a first payment from the first client, the payment including a service fee including a security professional hourly fee and a commission, wherein the commission is separate from the security professional hourly fee and is calculated based on a system defined percentage of the security professional hourly rate for the first nearby security professional;

initiating a second payment to the first nearby security professional in the amount of the security professional hourly fee;

the server application retaining the commission.

4. The computerized system of claim 3 wherein the specialty designation includes one or more of a body guard, private investigator, process server, security officer, or security guard.

* * * * *